US008166355B2

(12) United States Patent
Jashek et al.

(10) Patent No.: US 8,166,355 B2
(45) Date of Patent: Apr. 24, 2012

(54) SYSTEM AND METHOD FOR MITIGATING MEMORY REQUIREMENTS

(75) Inventors: Ronen Jashek, Shoham (IL); Roy Oren, Magshimim (IL); Alon Ironi, Haifa (IL); Dror Meiri, Haifa (IL)

(73) Assignee: Siano Mobile Silicon Ltd., Kfar Netter (IL)

( * ) Notice: Subject to any disclaimer, the term of this patent is extended or adjusted under 35 U.S.C. 154(b) by 871 days.

(21) Appl. No.: 11/884,033

(22) PCT Filed: Feb. 12, 2006

(86) PCT No.: PCT/IL2006/000179
§ 371 (c)(1),
(2), (4) Date: Jul. 23, 2008

(87) PCT Pub. No.: WO2006/085326
PCT Pub. Date: Aug. 17, 2006

(65) Prior Publication Data
US 2009/0055715 A1 Feb. 26, 2009

(51) Int. Cl.
*H03M 13/15* (2006.01)
*H03M 13/29* (2006.01)
*H03M 13/17* (2006.01)
(52) U.S. Cl. ......... 714/708; 714/758; 714/776; 714/784
(58) Field of Classification Search .................. 714/761, 714/762, 776, 784, 708, 758
See application file for complete search history.

(56) References Cited

U.S. PATENT DOCUMENTS

| 6,430,233 B1 | 8/2002 | Dillon et al. |
| 6,628,955 B2 | 9/2003 | Lee et al. |
| 6,675,346 B2 * | 1/2004 | Tsunoda ........................ 714/774 |

FOREIGN PATENT DOCUMENTS

GB  2415873  1/2006

OTHER PUBLICATIONS

International Search Report for WO 2006/085326 dated Nov. 8, 2006.

* cited by examiner

*Primary Examiner* — Stephen Baker
(74) *Attorney, Agent, or Firm* — Eitan Mehulal Law Group

(57) ABSTRACT

A receiver is provided, which is adapted to receive MPE-FEC frames and to correct erroneous sections within a received MPE-FEC frame by detecting unreliable sections and storing in an erasure list ("ESL") table compressed data that includes the base address of each detected erroneous section, together with the respective section's size. The size of the ESL table may be fixed, or it may correlate, or dynamically change according to the actual number of detected erroneous sections. The data stored in the erasure list may then be forwarded to a decoder to correct erroneous sections. The erroneous sections may be detected by using CRC, and the decoder may be a Reed-Solomon decoder. If the application data table of the MPE-FEC is error-free (or full or errors), in which case the erasure structure list is empty (or full of errors), in which case the erasure structure list is empty (or full), this means that no FEC reception and error corrections are required, because there are no sections to correct in the first case and the decoder is incapable of correcting too many sections in the second case. Therefore, the receiving circuitry, or at least the decoder, may be disabled to save battery power.

25 Claims, 9 Drawing Sheets

SYSTEM AND METHOD FOR MITIGATING MEMORY REQUIREMENTS

CROSS-REFERENCE TO RELATED APPLICATIONS

The present application is a US National Phase of PCT Application No. PCT/IL2006/000179, filed Feb. 12, 2006, the disclosure of which is incorporated herein by reference.

FIELD OF THE DISCLOSURE

The present disclosure relates generally to the field of mobile digital devices. More specifically, the present disclosure relates to a system and method for saving memory space in handheld and mobile devices while receiving multimedia information or data, including television ("TV") broadcasts and the like, in particular while processing Internet Protocol ("IP") datagrams that are contained within multi-protocol encapsulation ("MPE") forward error correction ("FEC") frames.

BACKGROUND

The capacity of multimedia services rendered is growing rapidly, side by side with communication standards that are being continuously formulated to adapt services to handheld, and in general to various mobile wireless services rendering devices.

One aspect of the rapid growth of multimedia services capacity is that many handheld digital telecommunication and/or multimedia systems are designed for multitask applications, such as audio, video and graphics capabilities, television reception and modem capabilities. Exemplary systems and devices include, without limitation, cellular phones, palm-PCs, portable media players ("PMP"), digital video cameras and digital still cameras.

In addition, the deployment of mobile devices with integrated support for the reception of digital TV signals is now a reality. Until now, the feasibility of such support has been limited by several key factors such as power consumption, performance and size. Most attempts at addressing the handheld receiver market have been based on adapting existing home set-top box solutions to the demanding environment of mobile reception. Currently, there are devices capable of receiving TV broadcasts that conform to mobile digital video broadcast terrestrial ("DVB-T") standards. VI3270T digital TV Receiver by Visson Technologies Inc. is an exemplary device for receiving DVB-T broadcast. DVB-T was not originally designed for mobile receivers.

The DVB-H ("H" standing for "handheld") standard, which is a complementary terrestrial multimedia broadcasting system designed especially for portable and mobile usage, utilizes a "time-slicing" process to reduce receiver power consumption, and multiprotocol encapsulation forward error correction ("MPE-FEC") to provide an additional layer of error correction. MPE-FEC utilizes what is known as a Reed-Solomon encoder. The Reed-Solomon encoder utilized in a DVB-H transmitter takes 191 data bytes and adds 64 parity bytes of redundancy. Additionally, the DVB-H transmitter calculates and transmits a cyclic redundancy check ("CRC") data in the MPE-FEC packet header, and the receiver recalculates it to flag the MPE-FEC packet content as unreliable if the CRC check fails. In general, CRC is an error-detection technique consisting of a test performed on each block or frame of data by both sending and receiving modems, or transmitters and receivers. The sending modem, or transmitter, inserts the results of its tests in each data block in the form of a CRC code. The receiving modem (or receiver) compares its results with the received CRC code and responds with either a positive or negative acknowledgment, which is equivalent, in the field of the present disclosure, to "reliable" or "unreliable" sections in the MPE-FEC table.

If the MPE-FEC packet content is unreliable, the bytes in the packet are termed "erasure" symbols, and using erasure symbols allows the Reed Solomon decoder in the receiver to correct twice the number of data bytes that could be corrected if erasures symbols (also called herein just erasures or erasures information or data) were not used. In the case where erasures are used, the Reed-Solomon decoder can correct up to 64 bytes out of a 255-byte codeword. Otherwise it can correct up to 32 bytes out of 255 byte code words.

One of the prime objectives of the "time-slicing" process is to reduce the average power consumption of the terminal and enable smooth service handover. "Handover" refers to a receiver seeking and using an alternative communication channel for receiving the same station in cases where the receiver fails to receive data/information due to poor communication path. Time slicing involves sending data in bursts using significantly higher instantaneous bit rate compared to the bit rate required if the data were transmitted using traditional streaming mechanisms. Using time slicing allows inactivating, such as by "shutting-down", the receiver for considerable amount of time; that is, most of the time the DVB-H receiver is in sleep mode, and it "wakes up" only to receive the required data packets. This saves considerable amount of power in the device. The time-slicing technology enables seamless handover between different DVB-H service networks. While in sleep mode, the DVB-H receiver can be woken up to search signals from neighbor networks or frequency bands or programs. Thus no additional hardware or double receivers are needed. Time slicing is more fully described in "Television on a handheld receiver—broadcasting with DVB-H", by the Digi-TAG—The Digital Terrestrial Television Action Group", and in "Mobile TV Forum" (website www.mobiletv.nokia.com/resources/faq/), for example. Each burst of transmitted data creates and transmits a data structure called MPE-FEC frame. The structure and processing of a MPE-FEC frame, a notion of which is given hereinafter, are defined by the DVB-H standard and in the implementation guide. Briefly, each MPE-FEC frame consists of two parts, the application data table, which may contain, for example, a portion of a video or audio transmission, and the error correction data table. The data in each table is arranged in sections, each of which may include one or more data bytes.

By "IP datagram" is meant herein an ensemble of consecutive digital bytes that represent a portion of the (or the entire) transmitted information. IP datagrams may vary in length; that is, in the number of their constituent bytes. By "section" is meant an ensemble of consecutive IP datagrams. According to telecommunication standards, different sections in a given MPE-FEC table may have different length though, for the sake of simplicity, sections in a given frame are typically characterized by having the same size. For example, a section may consist of a single MPE-FEC column, or one and a half columns, and so on. Nevertheless, current standards limit the maximal length allowed for a section to four consecutive columns.

One of the prime objectives of the "MPE-FEC" methodology is to improve the "channel-to-noise" ("C/N") ratio and Doppler performance in mobile channels, and to improve the receiver's tolerance to impulse interference. This is accomplished by using an additional level of error correction, FEC, at the MPE layer. By adding parity information (parity bits), calculated from the datagrams, and sending this parity data in separate (redundant) MPE-FEC sections, error-free datagrams can be output after MPE-FEC decoding, despite possible very bad reception conditions. Time slicing, including its use for saving electrical power, and MPE-FEC are described, for example, in "DVB-H—Mobile TV" ("Imagination Technologies 2005"); "DVB-H architecture for mobile communications systems" (by Stuart Pekowsky and Khaled Maalej, Broadcast/Satellite Communications, April 2005, World Wide Web rfdesign.com); "Digital Video Mobile Broadcast (DVB-H) specification" (Digital Video Mobile Broadcast, Jun. 30, 2005, World Wide Web cellular.co.za/technologies/dvb-h.htm); and in "Transmission System for Handheld Terminals (DVB-H)" (Digital Video Broadcasting, DVB Document A081, June 2004), herein incorporated by reference.

MPE-FEC data sections that are received by the receiver in each data burst are analyzed one section at a time, usually on-the-fly, by using a checksum calculation process that is based on a cyclic redundancy check ("CRC") technique to detect errors in them. If the CRC analysis indicates that a given MPE-FEC table includes one or more errors, then the receiver utilizes a Reed Solomon ("RS") decoder to correct the erroneous sections within the MPE-FEC table.

Conventionally, in order for a RS decoder in a receiver to correct MPE-FEC data sections, each section is marked either as an error-free (reliable) section or as an erroneous (unreliable) section, such as by storing in a memory a corresponding binary erasure flags (a binary value 0 or 1). More specifically, if a section is determined (by a CRC check) as an unreliable section, every byte of this section is marked as unreliable. Likewise, if a section is determined (by the CRC check) as a reliable section, every byte of this section is marked as unreliable. Therefore, conventionally, the entire MPE-FEC table (every byte in the MPE-FEC table) is assigned either a reliable flag (binary value 1, for example) or an unreliable flag (binary value 0, for example). Therefore, the memory used for storing the reliable and unreliable flags has a size that is as large as the total number of bytes in the MPE-FEC table. Only after the processing (by the RS decoder) of the reliable and unreliable flags it may be determined whether a given section is reliable or not.

Because many MPE-FEC sections are typically contained in each MPE-FEC frame that is transmitted during a transmission burst, correcting MPE-FEC data sections traditionally requires a relatively large memory, as it needs to have up to [Number_of_rows]×[Number_of_columns] bits (for example, 255 Kbits). Therefore, handling MPE-FEC sections in the traditional manner significantly enlarges the memory required for MPE-FEC handling by 12.5% (255 Kbits out of 2 Mbits).

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantages or improvements.

According to the present disclosure, the memory requirement is mitigated by storing in an erasure structure list ("ESL") table in a receiver, on-the-fly, data relating substantially only to sections in an MPE-FEC frame that are marked by an error detection means (a CRC estimator or calculator, for example) in the receiver as erroneous, or unreliable, sections.

As part of the present disclosure, a method is herein disclosed for mitigating memory requirements in a receiver during processing by the receiver of a section in application data residing within a multi-protocol encapsulation forward error correction ("MPE-FEC") frame. The method may comprise receiving the MPE-FEC sections and saving in an ESL table, per erroneous section, a linear address space related to that section if it is determined that the received section contains one or more errors. The linear address space may be defined as A+S, wherein A denotes the address of the first byte in the respective detected erroneous section, referred to hereinafter as an erroneous section base address, and S denotes the byte-wise length (in number of bytes), or size, of that section. A linear space of an erroneous section may be regarded as an association between the erroneous section base address and the byte-wise length of the section.

The step of storing linear address spaces in an ESL table may be repeated in respect of additional erroneous sections, each linear address space occupying one entry in the ESL table, and the linear address spaces may be, for example, ordered in the ESL table according to the order of the reception of the erroneous sections. For example, the linear address space associated with the first detected erroneous section may occupy a first entry, the linear address space associated with a second erroneous section may occupy the second entry, and so on. This way, essentially only data relating to erroneous sections (compressed data) are stored in the ESL table.

The transmitted MPE-FEC frame may include an encoded error correction data and a receiver may mute receiving elements and sections correcting elements if, after receiving the entire application data, the ESL table meets a predefined, pre-selected, dynamic, threshold or otherwise specified criterion. If, however, the ESL table does not meet any specified criterion, erroneous sections within the MPE-FEC frame may be corrected, as by a decoder, which may decode the encoded error correction data based on the linear address spaces stored in the ESL table. The ESL table may include an entry pointer for indicating to the receiver the address(es) of the erroneous sections within the MPE-FEC frame(s).

One such decoder used for correcting unreliable sections may be a Reed-Solomon ("RS") decoder, though other decoders may be used as well, provided that the transmitter transmitting the data utilizes a suitable encoder. In some embodiments the criterion for deciding whether to use the decoder may be based on the ESL table, such as whether the ESL is either empty or full. That is, if the ESL table is either empty or full, the decoder in the receiver may be inactivated to save power. Otherwise, the decoder will be employed to correct unreliable sections. Errors in the sections may further be detected as by using a CRC technique, though other techniques may be used as well. For example, a checksum method may be used.

A receiver is also disclosed herein. The receiver may include a receiving circuitry for receiving MPE-FEC type application data and encoded error correction data; an error detection means for detecting erroneous sections in the application data; a memory for storing therein at least received MPE-FEC type application data and encoded error correction data; a decoder for correcting erroneous sections forwarded to it from the memory; an erasure structure list ("ESL") table for storing therein linear address spaces associated with erroneous sections; and a data processing unit. The data processing unit, or data processor, may: (i) accept from the error detection means indications for erroneous sections, an indication per erroneous section; and (ii) cause linear address space(s) of erroneous section(s) to be stored in the ESL table, based on these indications.

The data processing unit may further check, per each received MPE-FEC frame, the ESL table and mute the receiving circuitry and/or the decoder if the ESL meets a predefined criterion. In some embodiments of the present disclosure, the criterion may be the ESL table being either empty or full. The data processing unit may cause the decoder in the receiver to correct erroneous sections stored in the memory, based on the linear address spaces stored in the ESL. In some embodiments of the present disclosure the error detection means may utilize a CRC for detecting errors in the MPE-FEC sections.

In some embodiments the receiver may be a DVB-H type receiver. In general, the receiver may be any receiver adapted to receive and process error-correction data, or the like.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

Figure 1:
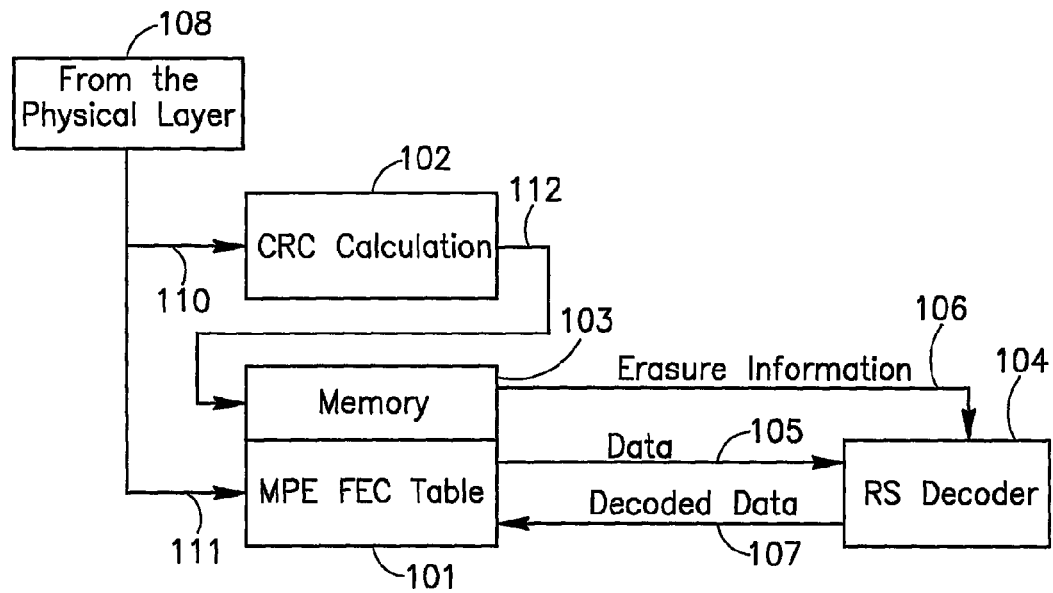
FIG. 1 schematically illustrates the general layout and functionality of the MPE-FEC related portion of a conventional DVB-H receiver circuitry capable of traditional handling of erasures.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The disclosure, its embodiments and its novel features, as well as items or according to the teachings, may take the form of an entirely hardware embodiment, an entirely software embodiment or an embodiment containing both hardware and software elements. In one embodiment, the disclosure is implemented in software, which includes but is not limited to firmware, resident software or microcode.

Embodiments of the present disclosure may include apparatuses for performing the operations described herein. This apparatus may be specially constructed for the desired purposes, or it may comprise a general-purpose computer selectively activated or reconfigured by a computer program stored in, or associated with, the computer.

Furthermore, the disclosure may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, magnetic-optical disks, a removable computer diskette, a random access memory (RAM), a read-only memory (ROM), a rigid magnetic disk, an optical disk, electrically programmable read-only memories (EPROMs), electrically erasable and programmable read only memories (EEPROMs), magnetic or optical cards, or any other type of media suitable for storing electronic instructions, and capable of being coupled to a computer system bus. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code has to be retrieved from bulk storage during execution. Input/output or I/O devices (including but not limited to keyboards, displays, pointing devices, or the like.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters or the like.

The processes and displays presented herein are not inherently related to any particular computer or other apparatus. Various general-purpose systems may be used with programs in accordance with the teachings herein, or it may prove convenient to construct a more specialized apparatus to perform the desired method. At least one desired structure for a variety of these systems will appear from the description below. In addition, embodiments of the present disclosure are not described with reference to any particular programming language. It will be appreciated that a variety of programming languages may be used to implement the teachings of the disclosures as described herein.

Reed-Solomon ("RS") code is referred to throughout the description. Briefly, Reed-Solomon codes are block-based error correcting codes with a wide range of applications in digital communications and storage. Reed-Solomon codes are used to detect and correct data errors in many systems including; wireless or mobile communications (including cellular telephones, microwave links, etc), satellite communications, digital television/DVB, high-speed modems such as ADSL, xDSL, and so on. To use RS codes, a data stream is first broken into a series of code words. Each codeword may consist of several information symbols followed by several check symbols (also known as parity symbols, parity data or parity bits). Symbols can contain an arbitrary number of bits. Once data is received at a receiving end, the receiver's decoder checks for and corrects essentially all of the, errors. In cases where the number of errors exceeds the error correction capability of the decoder, the errors cannot be corrected. More information on Reed-Solomon codes and on generator polynomials used for creating these codes may be found in "Reed-Solomon Codes: An Introduction to Reed-Solomon codes: principles, architecture implementation" (World Wide Web 4i2i.com/reed_Solomon_codes.htm), incorporated herein by reference.

Error correction decoding is often performed at least twice: the first time in respect of the physical layer and, the second time, in respect of the link layer (for example when evaluating errors in the MPE-FEC sections), and it might be performed also in the application layer. Reed Solomon code is typically used in conjunction with the DVB-H standard. However, in cases where other communication standards are, or will be, used (instead of, or in addition to, the DVB-H standard), other suitable coding techniques may be used as well, for example a coding technique known in the field as Turbo. In general, Turbo codes are a class of high-performance error correction codes finding use in deep-space satellite communications and other applications where designers seek to achieve maximal information transfer over a limited-bandwidth communication link in the presence of data-corrupting noise. More about Turbo codes may be found in the website http://en.wikipedia.org/wiki/Turbo_coding. Alternatively, or additionally, any type of signal processing technique may be used, which is capable of removing at least some data errors caused by various types of communication interferences.

Referring now to FIG. 1, a received MPE-FEC section may be obtained from the physical layer 108, transferred (at 111) to and stored in MPE-FEC Table 101. Data is also transferred (at 110) to CRC Calculation unit 102, for allowing the analysis of the received MPE-FEC section by CRC Calculation 102. If CRC Calculation 102 detects an erroneous, or unreliable, section (at 112) (which practically means that one or more errors exist in the received section), an indication of that fact is traditionally stored in a memory, such as memory 103, in respect of this section. If, however, CRC Calculation 102 does not detect errors in the MPE-FEC section, an indication of this fact is also traditionally stored in memory 103.

Data relating to erroneous and non-erroneous information or data, and/or to reliable and non-reliable data of the entire MPE-FEC table are forwarded (105) from MPE-FEC Table 101 to Reed-Solomon Decoder 104 alongside with related erasure information 106. Once Reed-Solomon Decoder 104 processes the entire MPE-FEC data forwarded to it (105), based on the related erasure information transferred to it (106), RS Decoder 104 sends (107) decoded data to MPE-FEC Table 101, to substitute therein erroneous sections with correct sections.

As stated hereinbefore, every section is traditionally assigned an erasure information, in the form of a binary marking flag(s), regardless of whether the section is a reliable section or not. This implies that, as is explained before, Memory 103 traditionally contains a corresponding binary flag (0 or 1) for every byte in the MPE FEC table, regardless of whether the byte is associated with a reliable or with an unreliable section. Since efforts are constantly made to reduce the physical size of memory devices and other electronic components, it would have been beneficial to find a method that will allow to reduce the size of the memory (memory 103, for example) associated with, or required during the, processing of MPE-FEC sections by RS Decoder 104.

Figure 2:
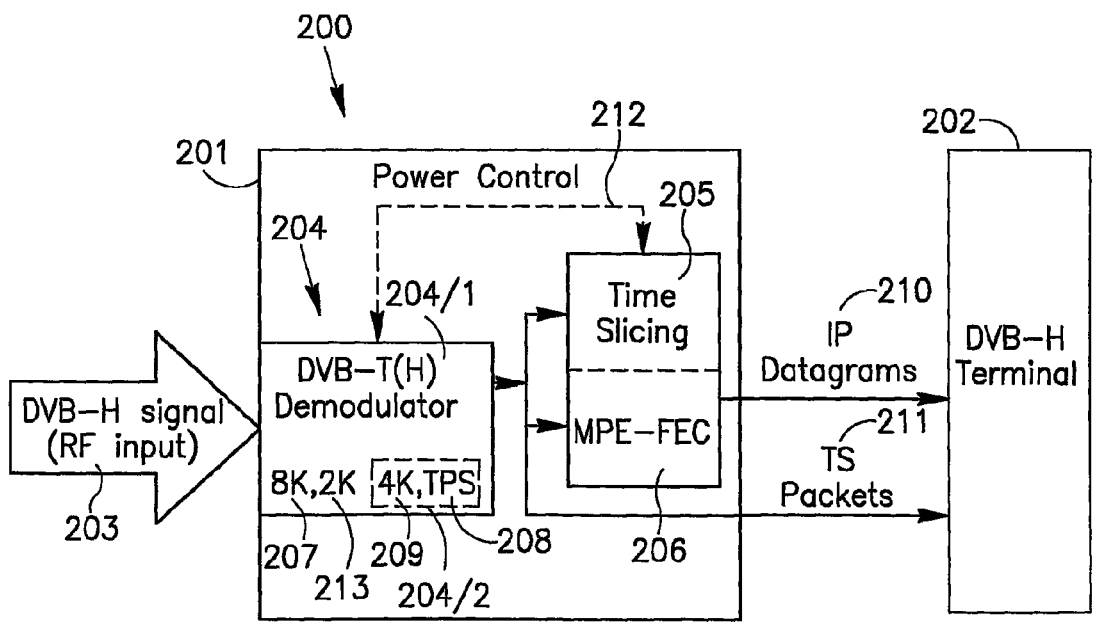
FIG. 2 schematically illustrates a typical DVB-H receiver.

FIG. 2 is a block diagram of an exemplary structure of a DVB-H receiver 200. A DVB-H receiver 200 typically includes a DVB-H demodulator 201 and a DVB-H terminal 202. DVB-H demodulator 201 typically includes, among the other things, a DVB-H demodulator (204) which includes a DVB-T demodulator 204/1 that is enhanced by additional functionality (marked as 204/1, for brevity), a time-slicing module (at 205) and an MPE-FEC module (at 206), the tasks of which are described hereinbefore and, additionally, hereinafter.

A DVB-H receiver (200) typically consists of service information and elements in the physical layer and in the link layer. DVB-H makes use of time slicing (at 205) and MPE-FEC (at 206) for the link layer, and DVB-H signaling, 8K-mode (at 207) and in-depth symbol interleaver for the physical layer. DVB-H uses signaling in the Transmitter Parameter Signaling ("TPS")-bits (at 208) to enhance and speed up service discovery. Cell identifier is also carried on TPS-bits 208 to support quicker signal scan and frequency handover on mobile receivers. 4K-mode (at 209) is used by DVB-H receiver 200 for trading off between mobility and Single Frequency Network ("SFN") cell size, for allowing single antenna reception in medium SFNs at very high speed, adding thus flexibility in the network design.

In-depth symbol interleaver is used for the 2K and 4K-modes (213 and 209, respectively) for further improving robustness in mobile environment and impulse noise conditions. To provide DVB-H services, time slicing (205), cell identifier and DVB-H signaling (208) are mandatory, whereas other technical elements may be combined arbitrarily, according to specific needs. It is noted that the payload of DVB-H is Internet Protocol ("IP")-datagrams (210) or other network layer datagrams encapsulated so as to form, or create, MPE-sections.

A Transport Stream ("TS") may contain data relating to video, audio, teletext, service information, conditional access information, and so on. Transport Stream consists of TS packets (211). Each packet of TS packets 211 is 188-byte long and contains a header and a payload section. The header of each TS packet 211 contains information about the contents of that packet and is intended for a TS de-multiplexer (not shown) in DVB-H terminal 202. The payload section contains the actual audio, video, teletext, and the like, data. The header typically starts with a synchronization word that is used for recognizing the start of the TS packet. Two bytes may follow the synchronization word, which contain some flags and the Packet ID ("PID").

The input signal to DVB-H demodulator 201 is a DVB-H signal (203) that includes time-sliced radio frequency ("RF") signals. As explained hereinbefore, time slicing involves sending data in bursts using a significantly higher bit rate compared to the bit rate required if the data were transmitted continuously. Within each data burst, the time to the beginning of the next burst ("delta-t") is indicated. At "off-time", which is the time between two consecutive time-sliced bursts, data relating to the elementary stream is not transmitted to allow other elementary streams to use other allocated bit rates. This feature enables a demodulator to stay active for only a fraction of the time, during which time it may receive data bursts relating to a requested service. If a constant low bit rate is required at the DVB-H terminal 202, the received data bursts (203) may be buffered to meet this requirement.

A data burst creates a data structure called a MPE-FEC frame. For demodulator 204, which is designed to support FEC, the size of the MPE-FEC frame (sometimes referred to as "table") is typically 2 Mbits. A demodulator which does not require having MPE-FEC capabilities typically requires a smaller table (a table of up to about 1.5 Mbits). During the processing (by MPE-FEC module 206) of data residing within MPE-FEC frame, the integrity of the entire data in the table, or at least the integrity of most of the data in the table, should be maintained. The MPE-FEC frame and the way it is processed are defined in the DVB-H standard and in the DVB-H implementation guide.

DVB-T demodulator 204 recovers Moving Picture Experts Group ("MPEG")-2 TS packets (at 211) from the received signal 203, and forwards them (at 211) to DVB-H terminal 202 for display. DVB-T demodulator 204 offers three transmission/reception modes, 8 K (at 207), 4 K (at 209) and 2 K (at 213). To each mode a corresponding Transmitter Parameter Signaling ("TPS") 208 is used. IP datagrams 210 include data that may be played by DVB-H Terminal 202. Time-slicing module 205 extracts from the RF signal demodulated by DVB-H demodulator 204 start and end instants of received data bursts (203) for synchronizing the processing of the MPE-FEC sections by MPE-FEC module 206. More about time-slicing, MPE-FEC, 4K mode and in-depth interleavers and DVB-H signaling may be found in "ETSI EN 302 304 v1.1.1" (2004-11), "Digital Video Broadcasting (DVB)" and in "Transmission System for Handheld Terminals (DVB-H)", the entire content of which is herein incorporated by reference.

As explained hereinbefore, MPE-FEC frames are transmitted in bursts so that the receiver, or parts thereof, can be shut down, or muted. Turning again to FIG. 2, the DVB-H demodulator 204 may be mute (212) by Time Slicing 205 between each two consecutive MPE-FEC transmission bursts.

Figure 3:
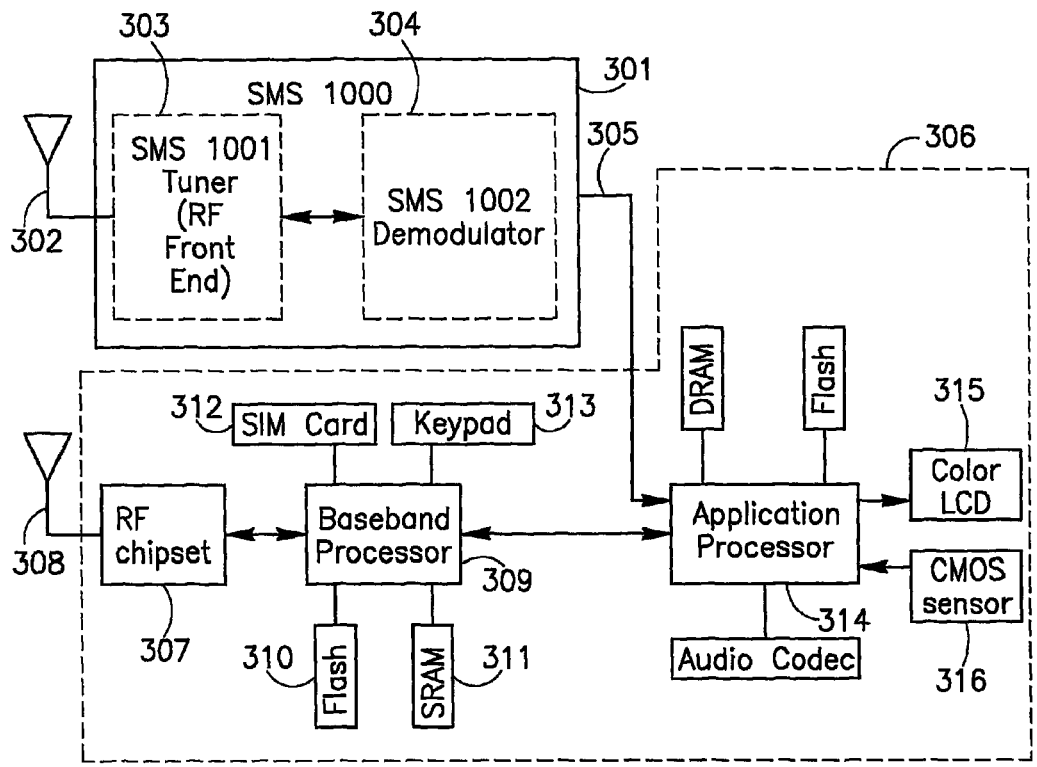
FIG. 3 schematically illustrates adding a mobile digital television ("MDTV") function to a mobile phone.

Referring now to FIG. 3, it shows a block diagram of a typical mobile digital television ("MDTV") demodulator (at 301), which may conform to the DVB-H standard, that is integrated with a mobile phone (at 306). A DVB-H signal may be received at antenna 302 and output by tuner 303 to demodulator 304 that may be a demodulator such as demodulator 201 of FIG. 2.

Exemplary mobile phone 306 is shown consisting of an RF chipset 307 for amplifying and filtering telephonic signals that may be received at antenna 308, and a baseband processor 309, which is coupled to Flash memory 310, serial random access memory ("SRAM") 311, SIM card 312 and keypad 313. Typical mobile phone 306 is also shown consisting of an application processor 314, which is coupled, among other things, to color liquid crystal display ("LCD") 315. Being exemplary mobile phone (at 306), each element unit or component therein may be substituted with a similar, or equivalent, element unit or component. For example, keypad 313 may be substituted with any suitable input device such as a keyboard, camera, touch screen, microphone, and so on. Likewise, display screen 315 is not necessarily color or LCD, and sensor 316 is not necessarily of the CMOS type.

MDTV demodulator 301 may forward (305) IP datagrams to application processor 314. If the IP datagrams are associated with television broadcast, then application processor 314 may generate from the IP datagrams a signal representative of the television images and send the signal to color LCD 315 for display. By using keypad 313, for example, a user of the device may use the device as a telephone or as a television set to watch a television program on color LCD 315.

Figure 4:
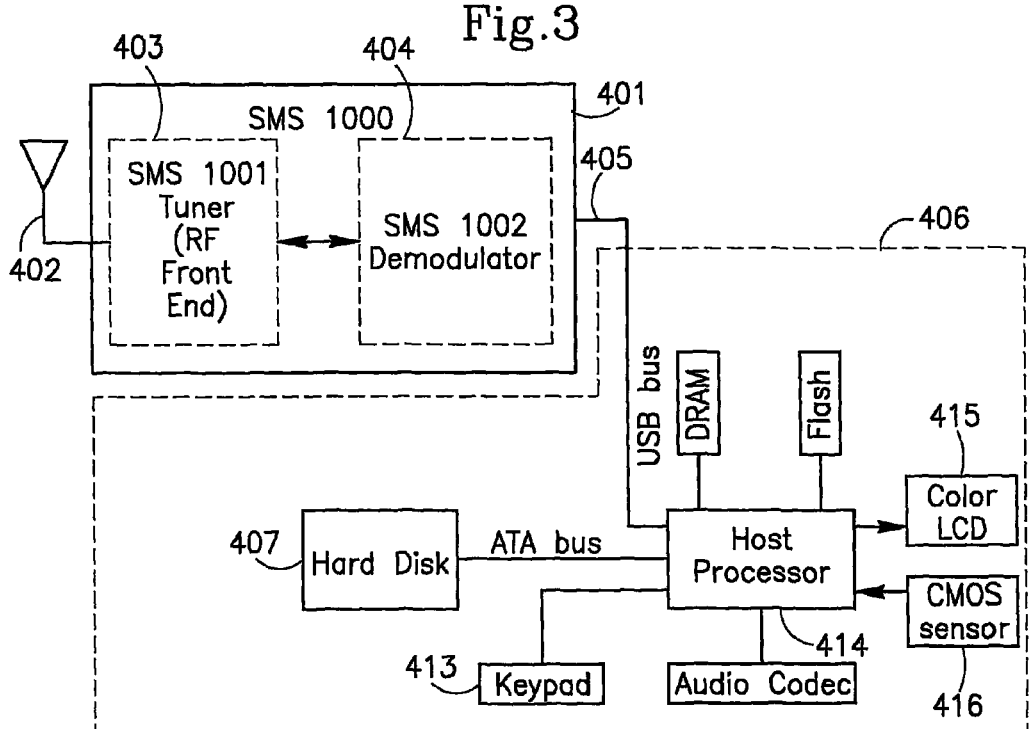
FIG. 4 schematically illustrates adding a MDTV function to a portable media player (PMP) system.

Referring now to FIG. 4, it shows a block diagram of a typical mobile digital television ("MDTV") demodulator (401), which may conform to the DVB-H standard that is integrated with a portable media player ("PMP") 406. A DVB-H signal may be received at antenna 402 and output by tuner 403 to demodulator 404 that may be a demodulator such as demodulator 201 of FIG. 2.

PMP 406 is shown comprising a hard disk (407) for storing various types of multimedia data, and a keypad (413). Typical PMP 406 is also shown comprising a host processor 414, which is coupled, among other things, to a color liquid crystal display ("LCD") 415. MDTV demodulator 401 may forward (405) IP datagrams to application processor 414. If the IP datagrams are associated with to a television broadcast, then application processor 414 may generate from the IP datagrams a signal representative of the television images and send the signal to color LCD 415 for display. By using keypad 413, for example, a user of the device may use the device as a multimedia player or as a television set to watch a television program on color LCD 415. Being exemplary portable media player (at 406), each element unit or component therein may be substituted with a similar, or equivalent, element unit or component. For example, keypad 413 may be substituted with any suitable input device such as a keyboard, camera, touch screen, microphone, and so on. Likewise, display screen 415 is not necessarily color or LCD, and sensor 416 is not necessarily of the CMOS type.

Figure 5:
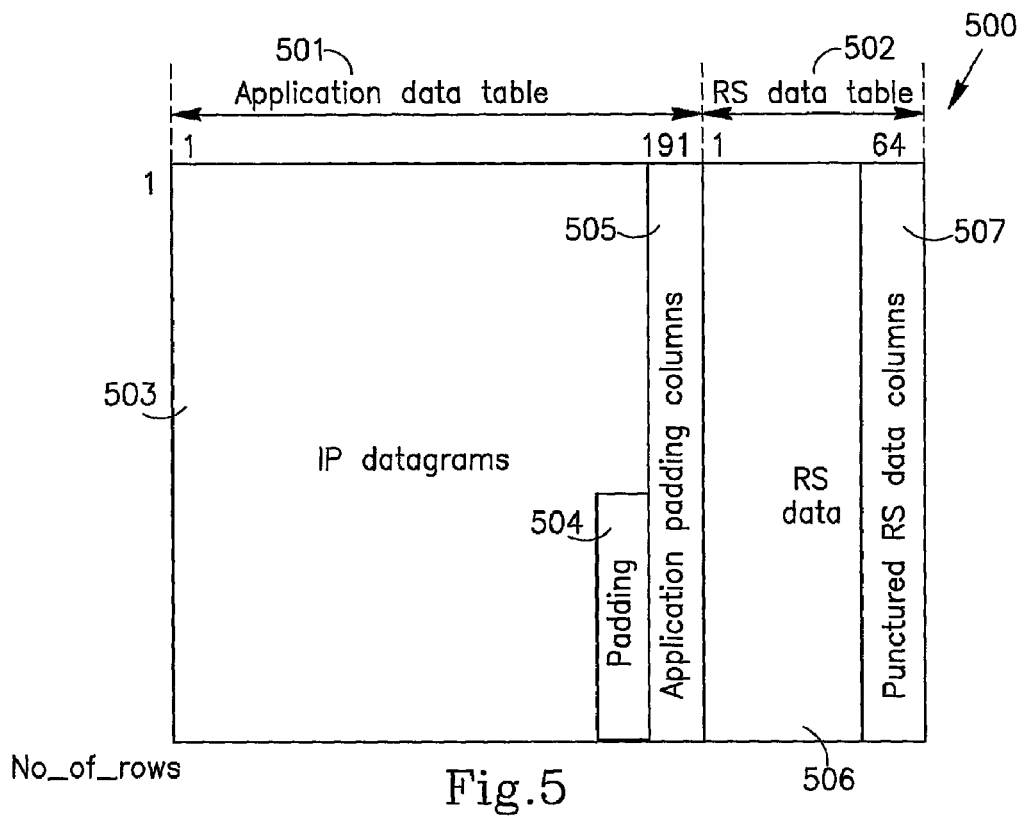
FIG. 5 schematically illustrates the structure of a MPE-FEC frame.

Referring to FIG. 5, an exemplary general structure of a MPE-FEC frame 500 is shown, which is arranged as a matrix with 255 columns and a dynamic, or flexible number of rows. A typical MPE-FEC frame consists of an application data table (501) and a Reed-Solomon (RS) data table (502). The application data table (501) contains 191 columns (designated 1 through 191) that contain Internet Protocol (IP) datagrams 503 relating to a multimedia content being broadcasted. Depending on the byte-wise length of IP datagrams 503, padding bytes may have to be used to complete the designated number columns in table 501. For example, application data table 501 is shown containing one column partially padded (504) and additional padded columns (505).

Figure 7:
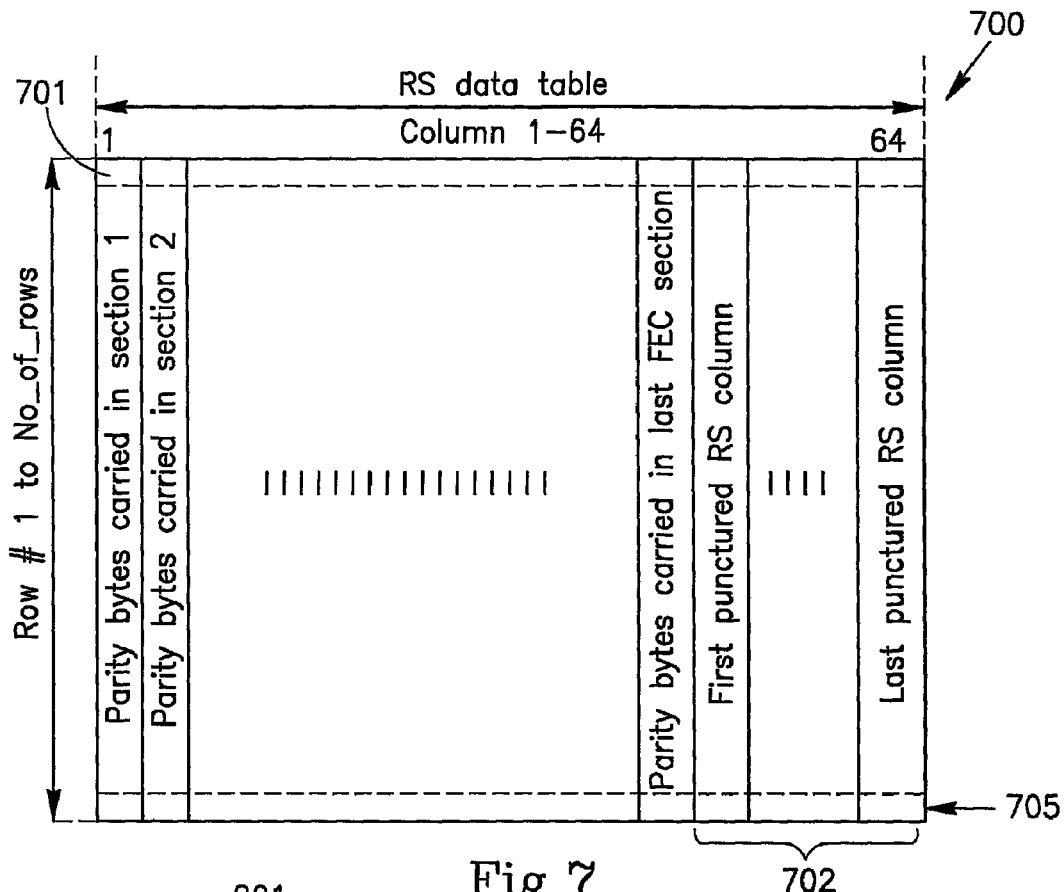
FIG. 7 shows in more details the RS data table of FIG. 5.

RS data table 502 contains 64 columns (designated 1 through 64) that contain Reed-Solomon data 506 that may be used for correcting MPE-FEC sections. Depending on the number of erroneous MPE-FEC sections detected, some of the columns in RS data table 502 may include punctured RS data columns (507). An exemplary RS data table is shown in FIG. 7 (at 700).

The number of rows may vary from 1 to a value signaled, or indicated, in the "time_slice_fec_identifier_descriptor". In general, the time_slice_fec_identifier_descriptor announces to the receiver the use of time slice and optional MPE-FEC data in the way specified in EN 301 192 [3]. The maximum allowed number of rows in MPE-FEC frame is 1024, which makes the total MPE-FEC frame as large as 2 Mb. Each entry in the matrix contains an information byte. RS data 506 are dedicated for the parity information of the FEC code. Each byte entry in the application data table 501 has an address ranging from 1 to 191×no_of_rows. Similarly, each byte position in the RS data table 502 has an address ranging from 1 to 64×no_of_rows. Addressing in RS table 502 is redundant because section_length and section_number are known.

Figure 6:
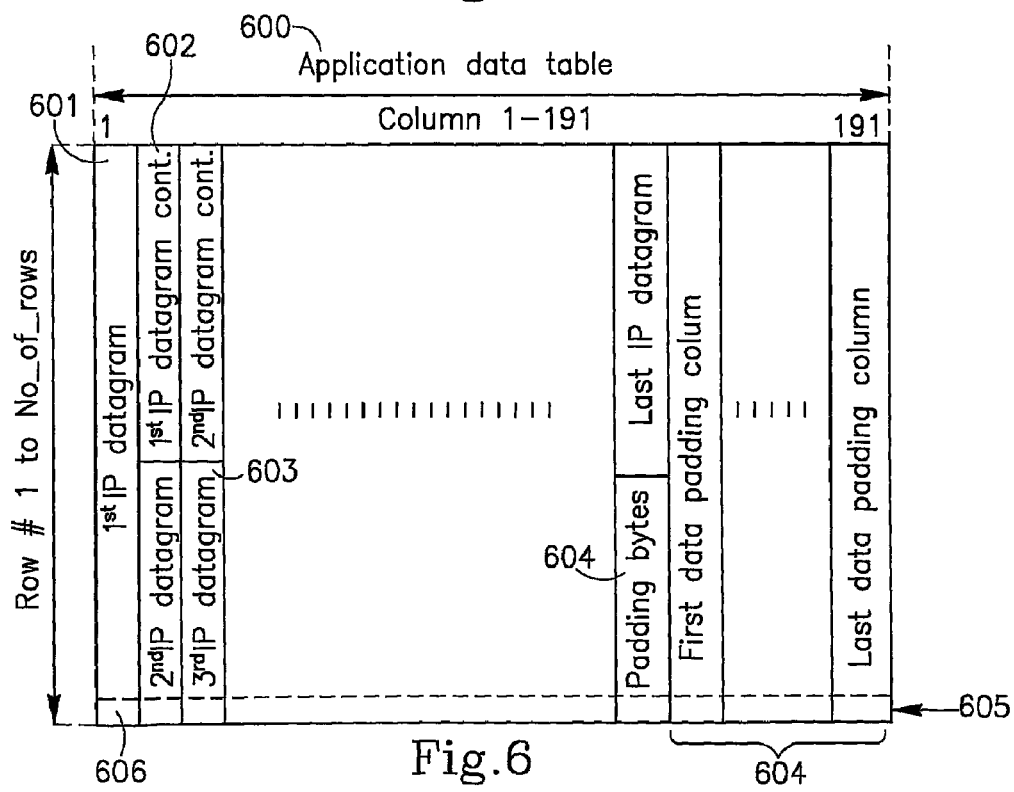
FIG. 6 shows in more details the application data table of FIG. 5.

IP datagrams are transmitted one datagram at a time, starting with the first byte of the first datagram in the upper left corner of the matrix and going downwards the first column, as exemplified in FIG. 6. The bit-wise length of IP datagrams 503 may vary arbitrarily, according to the actual data content, from one IP datagram to another, depending on the transmitted information, or multimedia content. For example, the first IP datagram ("$1^{st}$ IP datagram") is shown occupying about a full column (601) and a half (602). Likewise, the third IP datagram ("$3^{rd}$ IP datagram") is shown occupying about one half of a column (603). After the transmission of one IP datagram ends, the transmission of a following IP datagram starts. If an IP datagram does not end precisely at the end of a column, it continues at the top of the following column. When all IP datagrams have been entered into the application data table 600, any unfilled byte positions (604) are padded with zero bytes, which make the leftmost 191 columns completely filled. The number of padding columns in each MPE-FEC frame is signaled dynamically (to the receiver) in the MPE-FEC section. This signaling is typically implemented by using eight dedicated bits.

Referring again to FIG. 6, a Reed Solomon decoder corrects data in application data table 600 one row after another. The Reed Solomon decoder typically processes a plurality of rows in an application data table such as application data table 600, one exemplary row, row 605, is shown in FIG. 6. Data byte 606, therefore, resides in column 601, row 606.

With all the leftmost 191 columns filled it is now possible, for each row, to calculate the 64 parity bytes from the 191 bytes of IP data (and possible padding bits). The code used for this purpose is a code known in the field as the Reed-Solomon code (255,191), with a field generator polynomial and a code generator polynomial as defined hereinafter. Each row, then, is associated with one RS codeword. Some of the rightmost columns of the RS data table may be discarded and, therefore, not transmitted, to enable "puncturing". The exact number of punctured RS columns may change from one MPE-FEC frame to another, and it does not need to be explicitly signaled to the receiver. The RS data table (502) is also filled with punctured RS columns, to completely fill the MPE-FEC frame, as schematically shown in FIG. 7.

Referring again to FIG. 7, there is schematically exemplified a RS data table (700). RS data table 700 is shown consisting of 64 columns (1 through 64), each column containing parity bytes that are associated with a respective FEC section. The process by which the RS decoder corrects sections includes, among other things, handling one row after another in the MPE-FEC table, such that for each row in the application data table 600 in FIG. 6, the RS decoder utilizes parity bytes in the corresponding row in the RS data table 700. In general, the RS decoder corrects rows in application data table 600 by utilizing parity bytes in the respective rows in the RS data table 700. For example, the RS decoder may correct the last row (605) in application data table 600 by utilizing the parity bytes in the corresponding (last) row (705) in RS data table 700. Portion 702 of RS data table 700 may contain punctured RS columns.

An exemplary code generator polynomial may be calculated by:

$$g(x)=(x+\alpha^0)(x+\alpha^1)(x+\alpha^2),\ldots,(x+\alpha^{63})$$

where α=02 in hexadecimal (HEX) value.

An exemplary field generator polynomial may be calculated by:

$$p(x)=x^8+x^4+x^3+x^2+1$$

IP datagrams are encapsulated in MPE sections in the standard DVB manner, regardless of whether MPE-FEC measures are used or not. This renders the reception fully backwards compatible with receivers lacking MPE-FEC capabilities. Each MPE section carries a start address for the IP datagram, which is carried within the section. This start address indicates the byte position in the application data table of the first byte of the IP datagram and is signaled in the MPE header. The receiver will then be able to put the received IP datagram in the correct byte positions in the application data table and mark these positions as reliable for the RS decoder, provided that the CRC-32 indicates that the section is correct.

The last section of the application data table contains a "table_boundary" flag for indicating the end of the IP datagrams within the application data table. If all previous sections within the application data table have been received correctly, the receiver does not need to receive any MPE-FEC (redundant) sections and, if time slicing is used, the receiver can go to sleep mode without receiving and decoding RS data. In cases where MPE-FEC sections are received, the exact number of padding columns in the application data table is indicated (signaled using eight dedicated bits) in the section header of the MPE-FEC sections. The number of padding columns is needed only if RS decoding is performed. The parity bytes are carried in a separate, specially defined section type, with it's own indicator ("table_id"). Parity bytes are similar to MPE sections and are named "MPE-FEC sections". The length of an MPE-FEC section is adjusted so that there is exactly one section per column. Punctured columns are not transmitted and not signaled explicitly.

The number of rows is signaled in the time_slice_&_fec_identifier_descriptor but can also be determined from the "section_length" of the MPE-FEC sections, because the payload length of these sections is equal to the number of rows. In this way, there is always exactly one section per column. The number of punctured RS columns can be calculated as 64−"last_section_number", because the last_section_number indicator indicates the number of sections and therefore the number of columns.

The receiver introduces the number of application data padding columns with zero bytes, which is indicated dynamically by the MPE-FEC sections, and marks these MPE-FEC sections as reliable sections. If the receiver receives the table_ boundary flag correctly, it can also add any remaining padding bytes and mark these as reliable. Otherwise, these MPE-FEC sections will be regarded as unreliable, in the same way as other lost data. The receiver also introduces the number of punctured RS columns as calculated from last_section_number. The actual data in the punctured RS columns are irrelevant, as all punctured data are considered unreliable.

MPE and MPE-FEC sections are "protected" by a CRC-32 code, which reliably detects almost all erroneous sections. Only a negligible number of erroneous sections will not be detected by the CRC-32 code. For every correctly received section belonging to the application data table or to the RS data table, the receiver seeks in the section header for the start address of the payload within the section and is then able to put the payload in the right position in the respective table. Note that MPE sections may optionally contain a checksum procedure instead of a CRC-32. However, CRC-32 is preferred over the checksum procedure. After employing the latter procedure, there still may be lost sections; that is, there may be sections that cannot be corrected. All correctly received bytes, including application data padding, can then be marked as reliable and all byte positions in the lost sections and in the punctured RS columns can be marked as unreliable in the RS decoding.

All byte positions within the MPE-FEC frame (application data table plus RS data table) are now marked as either reliable or unreliable. With such reliability (erasure) information, the RS decoder is able to correct up to 64 such unreliable bytes per 255-byte codeword. If there are more than 64 unreliable byte positions in a row, the RS decoder will not be able to correct anything and will therefore typically just output the byte errors without error correction. After completion of the RS decoding, the receiver will reliably know the positions of any remaining erroneous byte within the MPE-FEC frame. If an IP datagram is only partly corrected, the receiver will be able to detect this and (optionally) to discard this IP datagram.

In addition to the CRC-32, the DVB-H's RS decoder also reliably detects erroneous TS packets. If the MPEG-2 demultiplexer discards erroneous packets, it could be configured not to build sections that are suspected as containing lost TS packets. In this way, only correct (reliable) sections would be built and the role of the CRC-32 would be to provide additional error detection functionality, which normally is not needed. It may occur seldomly that the DVB-H RS decoder will fail to detect an erroneous TS packet, which also happens to have the right Program ID, and that an erroneous section therefore could be reconstructed. In these cases, the CRC-32 would discover such a section error.

By introducing a certain number of zero-valued application data padding columns in the rightmost part of the application data table (501), it is possible to make the code stronger, meaning that more actual errors could be corrected. For example, one may autocorrect the zeros and than use the error correction for the other non-zero bytes. These padding columns are only used for the calculation of parity bytes; that is, these padding columns are not transmitted. In the receiver they are reintroduced and marked as reliable for the RS decoder. With 127 padding columns, for example, there are 64 columns left for IP data. With the 64 parity columns the effective code rate of the code becomes half, which means that, effectively, the number of parity columns equals the number of data columns. Regarding tables 600 of FIGS. 6 and 700 of FIG. 7, the effective code rate is ¾ (which is a weaker code rate than a code rate of ½), because there are 64 columns in the RS data table (700) as opposed to 191 columns in the application data table (600). However, the price for this is the effective codeword length being roughly decreased by 50%, since, instead of transmitting 255-byte long code words, only 128-byte long code words can be transmitted. The number of application data padding columns is dynamic and specified in the MPE-FEC sections. The allowed range of padding columns is 0-190.

An effectively weaker code may be achieved by puncturing. "Puncturing" is performed by discarding one or more of the last RS data columns. The number of discarded (punctured) RS columns may vary dynamically between MPE-FEC frames within the range 0 to 64, and can be calculated as 64−last_section_number, except for cases where no RS columns are transmitted in which case there are 64 punctured columns. Puncturing will decrease the overhead introduced by the RS data and thus decrease the needed bit rate. The drawback of puncturing lies in that it is relatively a weaker code.

Figure 8:
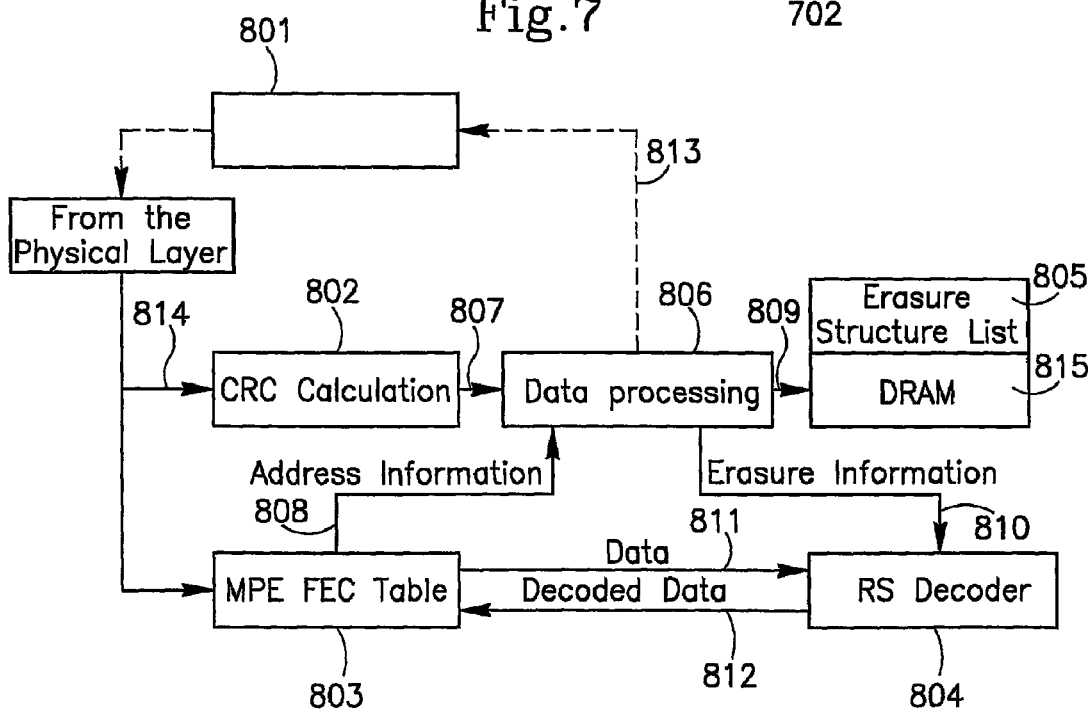
FIG. 8 schematically illustrates the general layout and functionality of a DVB-H receiver, or modem, circuitry according to some embodiments of the present disclosure.

Referring now to FIG. 8, the general functionality and layout of the present disclosure is schematically illustrated. Receiving circuitry 801 may receive, among other things, MPE-FEC type application data and encoded error correction data. Receiving circuitry 801 may forward (814) application data to error detection means, such as CRC calculation 802, to detect (on-the-fly) erroneous sections in the application data. A memory, such as MPE FEC Table 803, may be used to store therein the content of a received MPE-FEC frame that contains application data and encoded error correction data. RS decoder 804 may correct rows with erroneous bytes that are forwarded (811) to RS decoder 804 from MPE FEC Table 803. In accordance with some embodiments of the present disclosure, an Erasure structure list ("ESL") 805 is provided, which may be used for storing therein associations between the base address of each erroneous section and size (bit-wise length) of the related section. For example, for a given erroneous section, Data processing 806 may receive (807) from CRC Calculation 802 an indication that the section is erroneous. Responsive to this indication, data processing unit 806 may cause (808) MPE-FEC Table 803 to forward to it (808) the relative address, or location, information of the base address of the erroneous section, and also the bit-wise length, or size, of the erroneous section (the total number of bytes in the erroneous section). Optionally, data processing 806 may seek for the section's address. Data processing 806 may then store (809) the first byte's address, or location, and also the number of bytes in the erroneous section, in ESL 805, by using direct random access memory ("DRAM") 815 or any other type of memory. The process of storing erroneous section base addresses and associated sections' size in ESL 805 may repeat, on-the-fly, for each received erroneous section.

As opposed to the prior art methods where substantially each byte in the entire MPE-FEC table is marked by a binary flag (0 or 1) and stored in a memory, according to the present disclosure only the base address (A) of each erroneous section, together with the number of bytes (S) in the respective section, are stored in a memory, shown as Erasure Structure List 805 in FIG. 8, for example. Therefore, by employing the principles disclosed in the present disclosure, a significant reduction is obtained in the size of the memory that is required for storing erasure related data. When comparing the prior art methods to the novel method disclosed herein, it might be said that the present disclosure teaches a way for compressing erasure-related data, whereby to facilitate reduction of memory requirements. At the appropriate time, the compressed erasure-related data may be "decompressed" in order for it to be used by a decoder to correct erroneous sections.

After the reception of an entire MPE-FEC frame is completed, data processor 806 may cause (808) MPE FEC Table 803 to forward (811) to RS decoder 804 rows, one row at a time, and RS Decoder 804 to correct these rows based on corresponding erasure information that data processor 806 forwards (810) to RS Decoder 804. More specifically, Data processing unit 806 retrieves, or fetches, from ESL table 805 erasure data (linear address spaces) and translates the erasure data to corresponding binary flags, or marks, which are associated, per respective row in the application data table (600), with data bytes in corresponding rows. Then, Data processing unit 806 forwards (810) the resulting corresponding binary flags, or marks, to RS decoder 804, which utilizes the binary flags, or marks, to correct erroneous row(s) forwarded (811) to it. RS decoder 804 then forwards corresponding (corrected) decoded data (812) to MPE FEC table 803, to replace the erroneous row(s) with corrected row(s). Once the last erroneous row in the application data table (600) has been corrected by RS Decoder 804, a substantially error-free MPE-FEC table is obtained.

Data processing 806 may check, per received MPE-FEC frame, the content of ESL 805 and shut down, or mute, the receiving circuitry 801 and the decoder if the content of ESL table 805 meets a predefined criterion. The predefined criterion may be the ESL table 805 being either empty or full. The receiving circuitry 801 may be muted (813) by data processing 806 because if ESL table 805 is empty, this means that every received section is error-free and, therefore, there is no need to further receive encoded error correction data. If ESL table 805 is full, this means that the number of the erroneous sections is too large for decoder 804 to correct and, therefore, there is no point in receiving the encoded error correction data. In other words, the encoded error correction data is useless in cases where the number of erroneous sections in a single frame is too large. CRC Calculation 802 may utilize a cyclic redundancy check ("CRC") technique for detecting erroneous sections, though other methods may also be used. A receiver exploiting the principles and method disclosed herein may conform to the DVB-H standard, though other standards, which may be devised in the future, whether they are modifications of the DVB-H standard or different communication standards, may exploit the principles and method disclosed herein.

According to some embodiments of the present disclosure, the size of the ESL table may be fixed. According to some other embodiments of the present disclosure, the size of the ESL table may dynamically change according, or correlate, to the actual detected unreliable (erroneous) sections.

Fixed Size ESL

The fixed size ESL approach may be utilized in cases where the minimal size, or bit-wise length, of each of the MPE sections is at least as long as a column in the MPE FEC table. In such cases, the ESL table, for example ESL 805 shown in FIG. 8, may have a fixed size of 64 entries because a $65^{th}$ unreliable MPE section and onwards (if such section(s) exist) will essentially render an MPE-FEC table uncorrectable.

Figure 13:
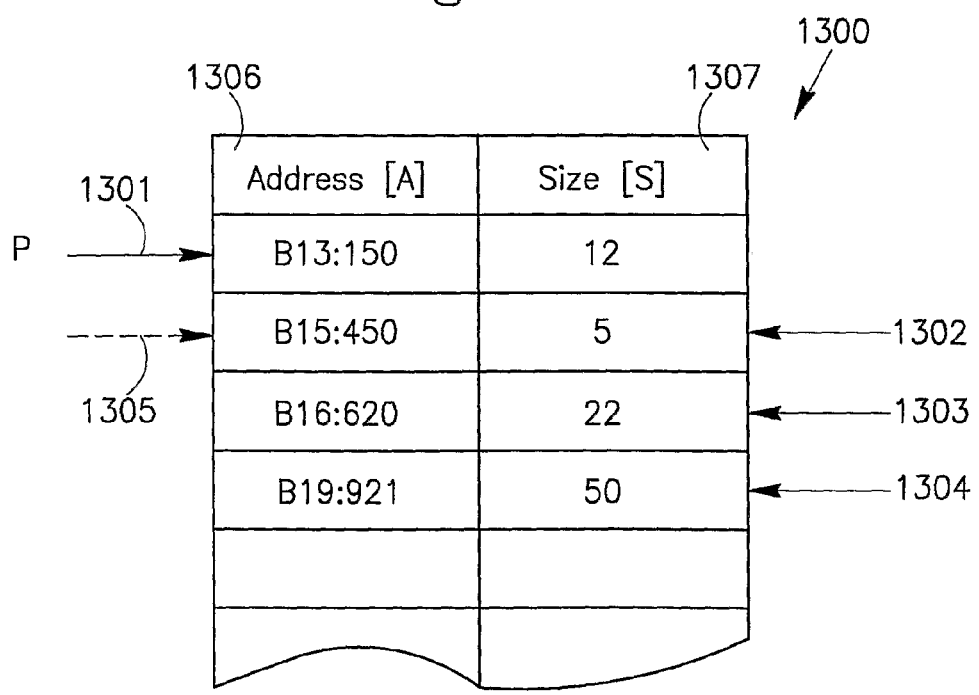
FIG. 13 schematically illustrates an exemplary partial content of an ESL table.

Referring now to FIG. 13, each entry in the ESL table consists of two fields; A(1306), which is an address field allocated for addresses of unreliable sections, and S (1307), which is a size field allocated for the size of the unreliable sections. The address field (1306) may be represented by 18 bits and its value may be calculated as follows:

$$A = C * \text{NUM\_OF\_ROWS} + R \quad (1)$$

where C is the current column number, NUM_OF_ROWS is the number of rows which form a single burst (defined also as a column size) and R is the current row number. For example, the byte located at the $51^{st}$ row and $73^{rd}$ column in a MPE-FEC table of 1024 rows will have the following linear address:

$$A = 72*1024+51 = 73779$$

The maximal address in a 1024-row table is: 254*1024+ 1024=261120. Alternatively, the base address (A) of an erroneous section may be the instantaneous value of an up counter that is reset at the MPE-FEC table first byte and auto-incremented for each received byte. The field S (1307) is represented by a number of bits that may be calculated as follows:

$$\log_2(\text{maximum\_size\_of\_a\_single\_MPE\_section}) \quad (2)$$

For example, S (1307) may be represented by 12 bits to correspond to sections having a maximum length of 4 Kbyte.

At initialization (after completing the processing of an MPE-FEC frame and before receiving the following MPE-FEC frame), all the entries in the ESL table are initially reset to a null value, for example to {A,S}={−1,−1}. The ESL table (ESL 805 of FIG. 8, for example) may be updated during MPE-FEC frame reception, starting from the first entry and possibly until the last entry and depending on whether errors are detected in the sections of the received MPE-FEC frame. If all the entries in the ESL table have a value other than the initial null value (for example, −1), the list is considered full. When all the entries still maintain their null value after completing the processing of the entire MPE-FEC frame, the list is considered empty.

Figure 9:
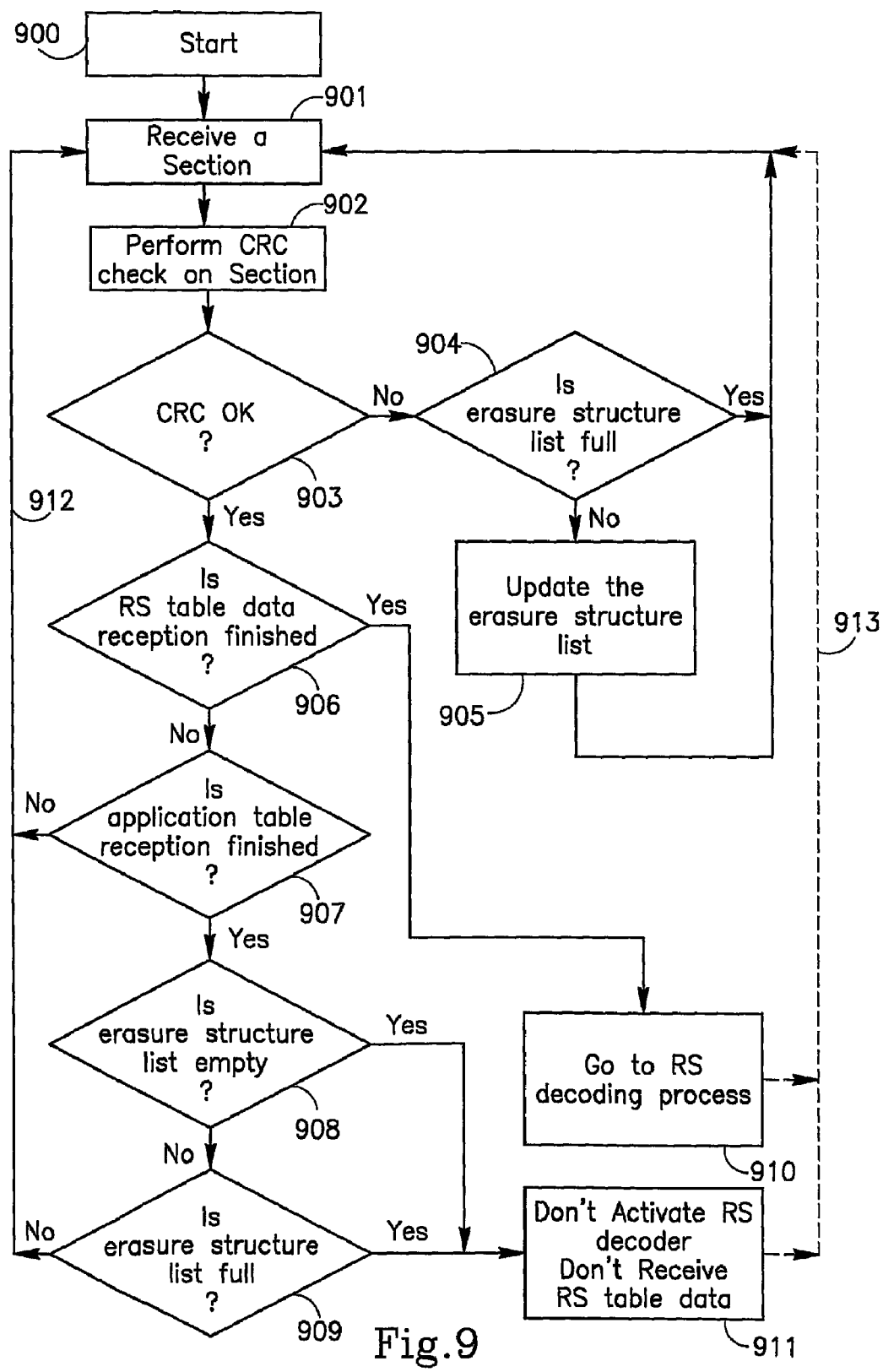
FIG. 9 is an exemplary flowchart for updating a fixed-size ESL table according to some embodiments of the present disclosure.
Figure 12:
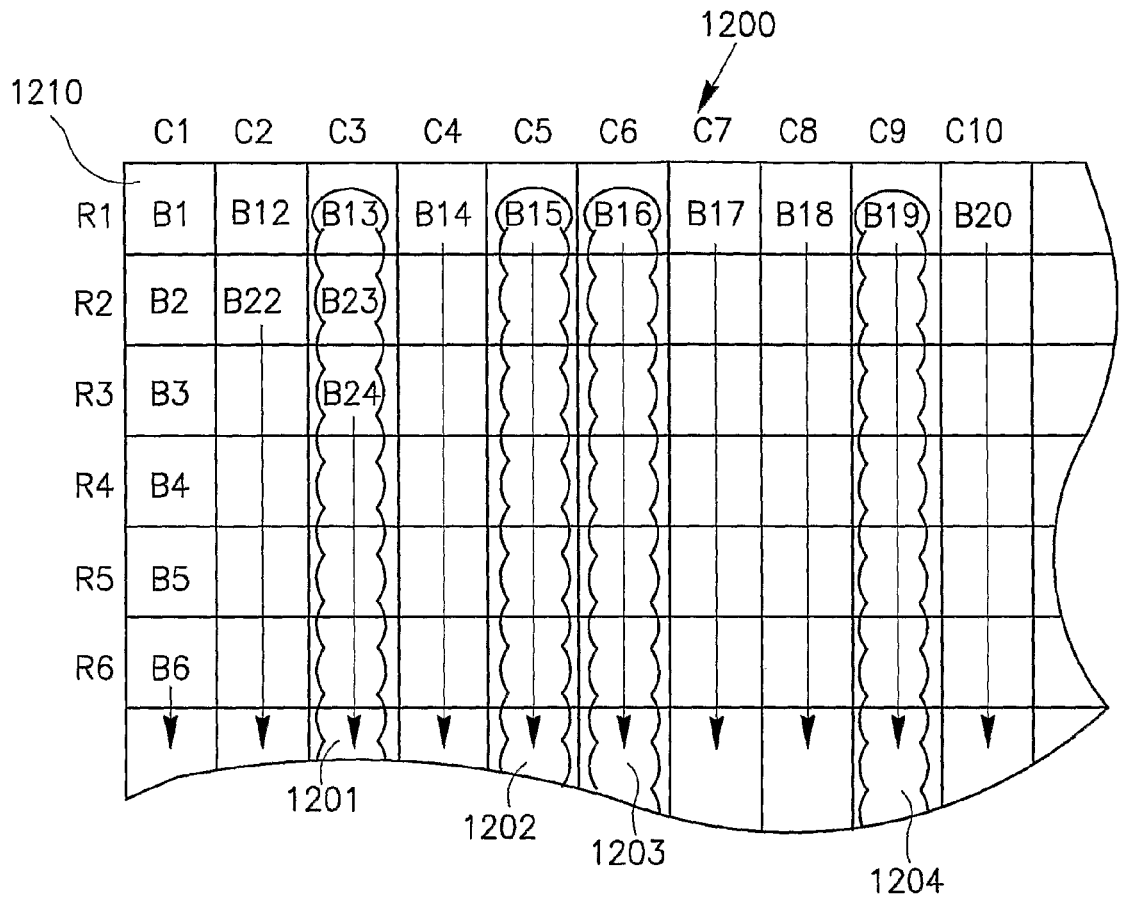
FIG. 12 schematically illustrates an exemplary partial MPE-FEC application data table.

Reference will be made now to FIGS. 9, 12 and 13. FIG. 9 schematically illustrates an exemplary process for handling a fixed-size ESL and a MPE-FEC table according to some embodiments of the present disclosure, whereas FIG. 12 shows an exemplary MPE-FEC table 1200. In FIG. 9, control is transferred from START 900 to Receive a section 901 for each MPE section that is received by the receiver. Each received MPE section is CRC'd (CRC is calculated for the section) at step 902 to detect errors in the MPE section (if errors exist). If the CRC detects an error in the section, it means that the entire MPE section is unreliable (erroneous). In other words, a CRC check can tell whether the entire section is erroneous or not without knowing how many errors there are in the checked MPE section and how the errors are distributed in the MPE section. Therefore, if an erroneous MPE section is found, the ESL table is checked (at 904). If the ESL table is not full, the ESL table is updated (at 905), that is, the starting section's linear address in the MPE-FEC frame and the section's size (associated to one another) are stored in the ESL table. For example, an erroneous section may consist of bytes B13, B23, B24 and so on (the bytes designated as 1201, FIG. 12) and its starting (base) address (the exemplary linear address, 150, of its exemplary first byte B13) and the section's size in bytes, 12 in this example, may be registered in the ESL table. If section 1201 (FIG. 12) is the first detected erroneous section, its staring address, 150 (in this example), and byte size, 12 (in this example), will form the first non-null value in the ESL table, as exemplified in FIG. 13.

If the ESL table is full, or overflows, and additional erroneous sections are detected (by the CRC checks, at step 903), the ESL table is not updated anymore and additional sections are received (at 901) and processed (to seek for error(s) therein). Nevertheless, CRC calculations may continue even though the ESL table overflows, in order to support other processes relating to signal quality diagnostics and reports, for example.

ESL table 805 of FIG. 8 (similar to table 1300 of FIG. 13) does not contain any data relating to reliable sections, a feature that saves a considerable amount of memory space in the ESL (and thus in the receiver). In accordance with the principles disclosed in the present disclosure, and assuming that the minimal sections' size is a single column, a typical size of the ESL table may be as large as about 2 Kbits, as opposed to up to 256 Kbits in traditional receivers. In general, the more columns constitute the sections, the smaller the memory capacity that is required for storing erasure information. For example, for minimal sections' size of two columns the maximal size of the ESL table is half the size of one-column-size sections (1 Kbits in the latter case, as opposed to 2 Kbits).

Because sections of the application data of the MPE-FEC are received before the Reed-Solomon ("RS") sections, the RS table remains empty as long as the sections of application data are being received. Therefore, step 906 is skipped during the reception of the application data.

According to step 907 of FIG. 9, if all of the MPE sections in a same MPE-FEC frame that correspond to the application data (the portion of the MPE-FEC table representing the information data) have been received, the ESL table is checked again (908). If, at this stage, the ESL table is still empty, this means that all of the IP datagrams in all of the sections are reliable. Therefore, the receiver may send the IP datagrams to a host (after IP filtering) and switch over to "sleep" mode of operation (911) until the next burst (new MPE frame) is received, for which loop 913 may iterate as sections of the new MPE frame are received one section after another. By "host" is generally meant a processor that accepts IP datagrams from a DVB-H decoder. Essentially, these IP datagrams are forwarded to the host from the MPE-FEC table, such as MPE FEC Table 803. By "sleep mode" is generally meant muting, or shutting down, all, or pre-selected, circuit and/or software elements that are responsible for receiving and/or processing data bursts, and possibly additional circuit elements (a decoder, for example) that are responsible for correcting erroneous sections. However, this type of "sleep mode" should not be confused with the traditional "sleep" mode. The traditional sleep mode involves entering that mode only between each two consecutive MPE-FEC frames. In contradistinction, according to the present disclosure, the receiver may enter a sleep mode at other instances within each MPE-FEC frame, in accordance with the content of the ESL table, as described herein. The receiver may switch over to sleep mode because there is no need for the receiver to receive the RS table data and to activate the RS decoder (911), because all of the IP datagrams in all of the sections are reliable (error-free). As was explained hereinbefore, the RS table data is the portion of the MPE-FEC frame that corresponds to the parity data; the data used to correct erroneous MPE sections.

The receiver may also enter into a sleep mode of operation (at 911) if the ESL table overflows (according to step 909 of FIG. 9). A ESL table is said to overflow if all of its 64 entries already have a value other than the initial null value and there is an attempt to add error-related data to the already exhausted ESL table. An overflowing ESL table means that essentially all RS code words contain at least 65 unreliable bytes and therefore the RS decoder is incapable of correcting the erroneous sections/IP datagrams. Therefore, if the ESL table is full, which is often an indication of table overflow, there is no point in receiving the RS table data and in activating the RS decoder (911). In the latter case, the receiver sends the detected reliable IP datagrams (if there are any) to the host (after IP filtering) and goes to "sleep mode" until receiving the next data burst. Although the MPE-FEC is uncorrectable in this particular case, diagnostics and reports on the number of CRC failures can be generated and possibly sent to the host for further processing, monitoring and for statistics calculations. If an ESL table is full (the ESL table contains 64 entries that contain non-null data) but the ESL table does not overflow, then the MPE frame involved is correctable. However, an overflowing ESL table (65 or more errors were found) implies that the associated MPE frame is not correctable.

In some embodiments of the present disclosure, the receiver may be allowed to receive two or more consecutive frames and only then enter into a sleep mode of operation. In some other embodiments the receiver may be allowed to receive two or more consecutive frames in parallel and only then enter into a sleep mode of operation. In such cases, another frame may be received before the previous frame's reception has finished. In some other embodiments the receiver may be allowed to receive two or more consecutive frames one after another and only then enter into a sleep mode of operation. In such cases, another frame may be received following reception of the previous frame.

After receiving all of the sections of the application data, and provided that the ESL table is neither empty nor full, the receiver may start receiving sections of the RS table. After all the RS table data is received (906) at the receiver, the entire ESL table may be checked once again because if the ESL table overflows now, there is no point in activating the RS decoder. If the ESL overflows, it means that essentially all of the RS code words contain more than 64 unreliable bytes and hence they are un-correctable. In this case, the receiver may send reliable IP datagrams to the host (after IP filtering) and go to "sleep mode" until it receives the next transmission burst. This means that the receiver does not employ, again, the RS decoder.

If the ESL table does not comply with the above described criterion; that is, the ESL table is neither empty nor full, this means that at least one of the code words in the received MPE-FEC sections is correctable and, therefore, the RS decoder may be employed at least once (at step 910). Accordingly, the receiver may process the MPE-FEC table row by row, as is described in connection with FIG. 10.

Figure 10:
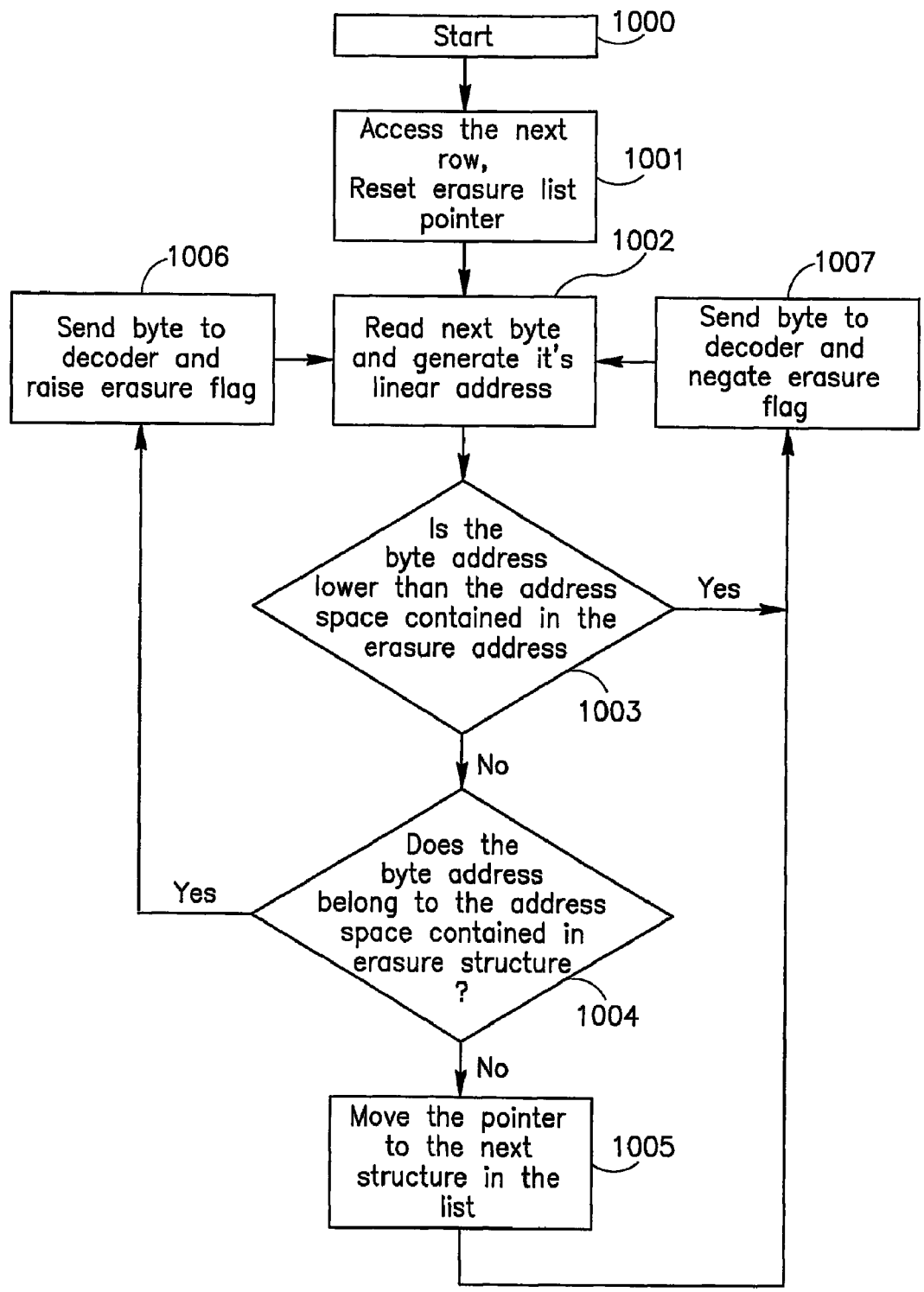
FIG. 10 is an exemplary flowchart for sending bytes and erasure flags to an RS decoder according to some embodiment of the present disclosure.

Referring now to FIG. 10, it shows the processing of rows of bytes in a MPE-FEC table. In general, each erroneous section, for example, section 1201 shown in FIG. 12, is indicated in the ESL table by having its linear address (the address of the first byte in the section) and size stored in the ESL table, as exemplified in FIG. 13. Therefore, the first entry of the ESL table indicates the first detected erroneous section, the second entry of the ESL table indicates the second detected erroneous section, and so on. It may occur that one or more reliable bytes in a given row will reside between two erroneous bytes, and the process illustrated by FIG. 10 is intended to locate the unreliable bytes and to send them to the decoder for rectification.

The following explanation refers to the first row in the received MPE-FEC table. However, all of the other rows in the MPE-FEC table may be handled in a similar manner. The way a row in a MPE-FEC table is processed according to the flowchart shown in FIG. 10 is hereinafter exemplified in association with FIGS. 12 and 13.

Before starting processing rows in MPE-FEC frame 1200 (see FIG. 12), control is transferred from START 1000 to Access the next row 1001 to reset a pointer to the entries of the ESL for pointing to the first entry in the ESL table (shown as 1301 in FIG. 13). The first byte, "B1", in the first row (R1) is read and its linear address, A, is calculated, at step 1002, by using, for example, formula (1).

In the exemplary MPE-FEC frame (1200) and ESL table (1300), it is assumed, for the sake of the explanation, that each section is consisted of one column. For example, section 1201 is shown in FIG. 12 consisting of one column. It is also assumed that four erroneous sections were detected by using CRC (upon their receipt by the receiver); sections 1201, 1202, 1203 and 1204. Therefore, the address of the first byte of each one of sections 1201 through 1204 is registered in the ESL table 1300. For example, pointer 1301 is shown pointing to the first entry of the ESL 1300, which contains the linear address (address 150) of the first byte (B13) of the first detected erroneous section 1201. Being the second detected erroneous section, the linear address of the first byte (B15) of section 1202 is shown registered in the second entry (1302) of ESL table 1300. ESL table 1300 contains additional third and fourth entries, 1303 and 1304, which correspond to the third and fourth detected erroneous sections 1203 and 1204, respectively.

The combination of a first (linear) address of the first byte in an erroneous section and the number of bytes in that section (section's size S in bytes), in a given entry in ESL table 1300 (for example, first linear address 150 and S being equal to 12 bytes) defines a "linear address space" for the corresponding section. For example, referring to the first entry (1301) of ESL table 1300, which corresponds to the first detected erroneous section 1201, the linear address space for that section (1201) starts with the address 150 and includes all addresses up to the address 162 (150+12). Referring to the third entry of ESL table 1300, which corresponds to erroneous section 1203 and is shown pointed at by 1304, the linear address space associated with section 1203 starts with the address 620 and includes all addresses up to the address 644 (620+22). Linear address spaces may vary in size and shift in the addresses domain in accordance with the corresponding erroneous section(s), such that each entry in the ESL table 1300 will have a different linear address space, as exemplified in FIG. 13.

For the sake of the explanation, it is assumed that the calculated linear address of the first byte (B1) 1210 is 1. Accordingly, because the calculated linear address (1, for example) of the first byte (B1) is lower than the minimal address (150), in the first entry in the ESL, a condition that is checked at step 1003 in FIG. 10, it means that though errors were not detected in respect of this section, byte B1 is to be forwarded to the decoder, at step 1007 (in FIG. 10), together with an indication that this byte is surely reliable. That is, an erasure flag is not raised in respect of this byte. Then, the second byte (B12) of the same row R1 is read (at step 1002), and because its linear address is also lower than 150 (the first entry in the ESL table 1300), this byte is treated in the same way as byte B1, and the next byte (B13) of the same row R1 is read.

Because the linear address of byte B13 (linear address 150) is contained within, or belong to, the linear address space defined by 150+12 (see step 1004, FIG. 10), byte B13 is forwarded to the decoder with an indication to raise a corresponding erasure flag (at step 1006). Then, the next byte (B14) in the same row R1 is read (at step 1002). By "contained within, or belong to, the linear address space" is meant an address (linear_address) that is calculated in respect of a currently read byte, which meets condition (3) for any positive i<64, where i is the index, or the position of pointer 1301 in respect, of the entries of the ESL table 1300, and 64 refers to the discussed exemplary case:

$$Ai < \text{linear\_address} < Ai+Si \quad (3)$$

where Ai is the linear address of the first byte in a given section and Ai+Si is the address of the last byte in this section, the difference therebetween corresponding to the section size S, in number of bytes.

At this point, the pointer 1301 is still pointing at the first entry of ESL table 1300, and therefore to the linear address space, or range, defined by addresses 150 through 162 (150+12). Therefore, byte B14 has linear address (395, for example) that is not lower than the address (150+12=) 162 (step 1003), and it is not contained within the linear address space defined by addresses 150 through (150+12=) 162. Therefore, the pointer 1301 is moved so as to point at the next entry (1305) in the ESL table 1300, and, after checking whether byte B14 is contained or not in the linear address space related to entry 1302 in the ESL 1300, byte B14 is forwarded to the decoder without raising an erasure flag.

If a given byte address is larger than any one of the addresses defined by the corresponding linear address space (see step 1004, FIG. 10), this byte is considered reliable, and, since there is no point, at least not at this stage, in testing the rest of the bytes in, or belonging to, this row (because these bytes are not referred to, or included, in the ESL table), the pointer of the ESL table is incremented (moved) to point at the next entry in the ESL, at step 1005, and the current byte is checked again against the new linear address space created by the current entry in the ESL. If the current byte address being checked is smaller than (not resides within) the linear address space against which it is compared, or checked, then the current byte is sent to the RS decoder and an erasure flag is not raised, at step 1007. However, if the current byte address being checked resides within the linear address space against which it is compared, the byte is sent to the RS decoder and an erasure flag is raised (from 0 to 1).

In a case where more than 64 unreliable bytes are detected in the same row and notified to the decoder (an erasure flag is raised for each unreliable byte), the decoder stops the decoding and skips to the next row. Otherwise, after decoding, the corrected codeword is written back into the MPE-FEC table memory, to override the original erroneous codeword. The latter process can be implemented in few different architectures or algorithms. However, the latter described implementation enables an efficient, low cost and low size implementation.

In accordance with the principles disclosed herein, the required memory size (Ms) for the ESL table equals the number of entries (Ne, an entry per section) multiplied by the sum of the address precision (Ap) and the size precision (Sp) in bits. By "address precision" is meant $\log_2\{\text{address\_domain}\}$, where address_domain refers to the entire address space of the MPE-FEC table. Assuming Ne=64 entries (one entry per column of a total of 64 entries in the RS data table 700 in FIG. 7), Ap=18 and Sp=12 bits as before, the required memory size is:

$$Ms = Ne*(Ap+Sp) = 64*(18+12) = 1{,}920 \text{ bits} \quad (4)$$

Note that if the MPE section has a fixed length of one column (for example), which means that the size precision is 10 bits and not 12 bits, then the memory required for the ESL table is 64*(18+10)=1,792 bits. If, according to another example, the MPE section has a fixed length of 4 columns (which implies 64/4=16 entries), then the memory required for the ESL table is 16*(18+12)=480 bits. If each section is consisted of 4 columns and there are more than 16 (rather than 64) erroneous sections, this means that there are more than 64 erasures, and hence the ESL table overflows.

When all the bytes of a currently processed row (row R1 in FIG. 12, for example), are checked in the way described hereinbefore, the ESL pointer 1301 is reset (moved to the first entry of the ESL table) and the bytes of the next row (row R2 in FIG. 12, for example) are read and processed, one byte after another, in the way described hereinbefore. This way, the entire rows of the MPE FEC table (for example MPE FEC table 1200 of FIG. 12) are processed, one row after another.

Dynamically Sized ESL Table

This type of ESL management, or approach, is useful in cases where several consecutive errors are likely to be detected. In such cases, there is no point in wasting a separate entry for each one of the consecutive errors. Instead, the size of the erasure structure list is correlated to the number of erroneous sections in a MPE-FEC frame. That is, for each ensemble of consecutive errors only the address of the first error is stored in the ESL table, together with the accumulative length/size S of the consecutive erroneous sections. This way, the size of the memory required for the ESL entries is reduced further (comparing to the fixed sized ESL table).

Figure 11:
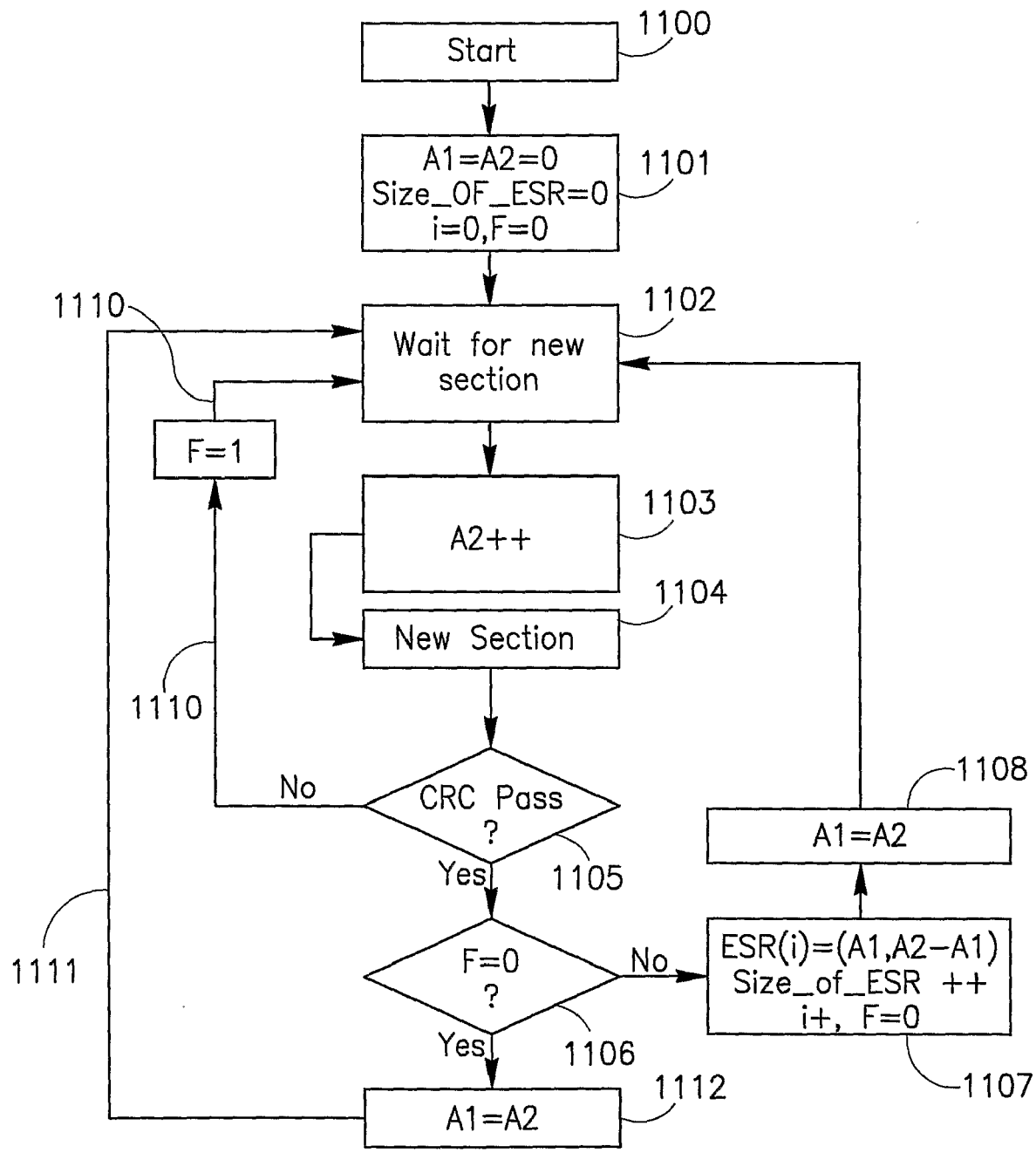
FIG. 11 is an exemplary flowchart for dynamically updating an ESL table according to some embodiments of the present disclosure.

According to this approach, or scheme, the size of the ESL dynamically changes for accommodating for additional erroneous section, as they are detected (using CRC) on the fly, and the maximum size of the dynamic ESL table is the size of a fixed-size ESL table. In employing this scheme, several variables are defined: A1 is a "string base address", A2 counts sections in bytes, whether they are erroneous or not. The difference A2−A1 is the "size of a given string of consecutive erroneous sections" because A1 is always assigned strings' base addresses (by performing A1=A2, as shown in FIG. 11). Size_of_ESL represents the dynamic (changeable) size of the ESL table, ESL[i] is the changeable ESL table formed as an array having a changeable dimension that is set by Size_of_ESL, i is an index (pointer) that points at the ESL entries, and F (0 or 1) is a binary flag that is raised (its value is changed from 0 to 1) whenever there is a need to update the ESL table.

Referring now to FIG. 11, an exemplary flowchart for handling a dynamically-sized ESL table according to some embodiments of the present disclosure is shown and described. Control is transferred from START 1100 to an initialization step 1101, where A1=A2=Size_of_ESR=i=F=0. At step 1102, a first section is waiting to be CRC'd (that is, processed by a CRC estimator or calculator to determine whether or not the section is erroneous). At step 1103, the value of A2 is updated with the size (byte-wise length) (S) of the first waiting section (yet to be CRC'd), hereinafter referred to as S1, to yield A2=A2+S1, indicating thereby that the first section has been read (factored in). Then, the waiting section (the section currently on hold) is read at step 1104 and CRC'd at step 1105. If errors are found in this section, then F is assigned a binary value 1 to indicate that the currently processed section is an erroneous section. Then, the first section, whose size S1 has been assigned to A2, is CRC'd at step 1105. Assuming that this (first) section is erroneous, shown as No, flag F is assigned a binary value 1, and the second consecutive section awaits processing (at step 1102). The size of the second waiting section, referred to as S2, is accumulatively assigned to A2, to yield A2=A2+S2=S1+S2. A2, therefore, accumulates strings of consecutive erroneous sections. Each string may consist of one or more consecutive erroneous sections that keep accumulating as long as loop 1110 continues without interruptions. Accordingly, wherever the term "string" is used hereinafter, it means a string of consecutive erroneous sections. Any interruption of loop 1110 (which means that a reliable section has been detected at step 1105, terminates a string, whereas a newly detected erroneous section string starts a new string, and so on.

Upon deciding that a given section does not contain errors, a condition that is checked at step 1105 (shown as Yes), then, at step 1106, the value of F is checked. If, at step 1106, F=1, it means that a string of consecutive erroneous sections is being created. Because at this stage F=1, due to the preceding section being erroneous (1110), the next step to implement is step 1107. At step 1107, the last known value of A1 (0 in this case), which is the address of the first byte in the currently processed (created) string, referred to herein as a string base address, is registered in ESR[i], with i=0, and so is the difference A2−A1, which equals the total number (accumulated size) of bytes contained within that string. Accordingly, if, for example, a first string consisting of three consecutive erroneous sections has been found, which includes, say 85 bytes, then ESL [0]=ESL[A1,A2−A1]=[0, 85−0]=(0, 85). Then, the size of ESR[i] and index 'i' are incremented (Size_of_ESL++=ESL[i+1]=ESL[0+1]=ESL[1]) for adding a new entry to ESL[ ] for accommodate for another string). In addition, flag F is reset (F=0) at step 1107.

If a reliable section is found (shown as Yes at step 1105), which follows a given string, it means that F=1 (from step 1109). Therefore, at step 1106, F does not equal 0, and, at step 1107, the string base address (A1) with the string's accumulated size (A2−A1) are stored in the ESL table, a new entry is added to the ESL table and F is assigned the value 0. The string base address variable A1 is updated with the value of A2, at step 1108. Now, if another reliable section is detected, shown as Yes at step 1105, then at step 1106 F equals 0 (from step 1107) and, therefore, at step 1112, A1 is assigned the value of A2, and a new section awaits processing, at step 1102. If no erroneous sections are detected in a received MPE-FEC frame, the value of F remains 0, a condition that is checked at step 1106, and loop 1111 continues for each section, while, for each section, A1 keeps track of A2, as shown at step 1112. However, should an erroneous section be detected (at step 1105), the error free loop 1111 will be interrupted and loop 1110 resumed, where upon each interruption of loop 1110 (meaning that an error-free section was found after at least one erroneous section), the ESR [i] will be updated.

A "gap", or difference, between the value of A1 and A2 will occur every time a string of erroneous section(s) is detected, because every time loop 1110 is performed, the value of A2 accumulatively changes, whereas A1 remains with the last value assigned to it "outside" loop 1110; that is, with the value assigned to it either at step 1108 or at step 1112. A1 is assigned the value of A2 (at steps 1108 and 1112) in order to update A1 with a probable new string base address. The new string base address is probable at first, because when the assignment A1=A2 occurs, it is not yet known whether the next section is, or is not, erroneous. If the next section will eventually be found to be erroneous (shown as No at step 1105), only then the "probable" string base address will become, or be considered as, a "certain", or actual, string base address, and the accumulating size of that string will grow in accordance with the number of repetitions of loop 1110. Each entry of ESL[i] will contain a string base address (A) with the related string size (S). That is, at any given time the number of the entries of ESL[i] equals the number of already detected strings plus one entry that is reserved for a probable next string.

In general, at a first step (step a that is described in connection with FIG. 11), CRC is calculated for each received MPE-FEC section. As long as the CRC does not detect errors, no ESL updates occur. However, if the CRC detects a first error, the intermediate address A1 associated with it is registered, and the CRC is calculated in respect of the next MPE-FEC sections until an error-free section is detected by the CRC check (A2). At this point, the next entry of the ESL is updated such that A=A1 and S=A2−A1. If the condition Sum(S(i))> 64*NUMBER_OF_ROWS, the ESL table is considered overflowing since no matter what the next entries are, the MPE-FEC table is uncorrectable.

At step b, after all MPE-FEC sections that correspond to the application data table are received, if the ESL is (still) empty, this means that all IP datagrams in all the sections are reliable, and therefore the receiver forwards the IP datagrams to the host (after IP filtering) and goes to "sleep mode" until the next received burst. While in sleep mode of operation, the receiver does not try to receive the RS table data and does not operate the RS decoder. If, however, the ESL overflows, this means that essentially all RS code words contain more than 64 unreliable bytes and therefore they are uncorrectable. In the latter case, the receiver sends the reliable IP datagrams to the host (after IP filtering) and goes to "sleep mode" until the next burst. This means that the receiver does not try to receive the RS table data and does not operate the RS decoder. Although the MPE-FEC table is uncorrectable in this particular case, diagnostics and reports on the number of CRC failures may be generated and possibly sent to the host for further processing and monitoring.

At step c, the erasure structure is checked again after all the RS table data is received. If it is full, this means that essentially all of the RS code words as a whole contain more than 64 unreliable bytes and hence they are uncorrectable. In this case, and depending on the application, the receiver may send only the reliable, or the entire table of, IP datagrams to the host (after IP filtering) and goes to "sleep mode" until the next burst. This means that the receiver does not operate the RS decoder. The difference between steps c and b is that in step c the RS data table is received while in step b the RS data table is not received, which saves power that is equivalent to the power required to receive about a quarter of a data burst.

At step d, if the ESL table is neither empty nor full, this means that at least one of the code words forwarded to the RS decoder is correctable and hence the RS decoder should be employed at least once. Accordingly, the receiver processes the MPE-FEC table one row at a time. The following description will be given in respect of the first row, but other rows are processed likewise. Each byte address (which corresponds to a column within a given row) can be associated with a "linear" address that can be calculated by using formula (1). If the linear address is contained in the "linear address space" associated with the current entry of the ESL, then this byte is considered "unreliable". By "contained" is meant meeting the condition: $Ai<linear\_address<Ai+Si$, for any positive $i<size\_of\_ESL$, where 'Ai' is the address of the first byte in a given section and 'Ai+Si' is the last address in the same section, the difference there between corresponding to the section size. 'i' is the index of the entries at the ESL. If, however, this address is not contained in the "linear address space" associated with any entry of the ESL, then this byte is considered "reliable". A reliability flag is signaled to the RS decoder together with the codeword. In cases where more than 64 unreliable bytes are detected in the same row, the RS decoder is notified about it, stops the decoding and skips to the next row. Otherwise, after RS decoding, the corrected word is written in the MPE-FEC table memory to override the original erroneous word. Step d can be implemented in different architectures or algorithms. However, the method described herein enables an efficient, low cost and low size implementation.

In the worst case where all the erroneous sections are fragmented along the entire table, the required memory for the ESL equals the number of entries multiplied by the sum of the address precision and the size precision. Referring to the example described before where the minimal and maximal size of the MPE section are 1 and 4 columns, than in the worst case the size of the ESL table will be as before; 64*(18+12)= 1,920 bits. However, in the case where all the errors occur immediately one after another, the size of the ESL will be as small as 34 bits (18 bits for the address and 16 bits for the size). Therefore, on the average, dynamic ESL allocation saves approximately half the memory size required comparing to the fixed ESL size implementation.

If the minimal size of the MPE sections is not known in advance, it may be difficult to define the size of the ESL table both for fixed and dynamic ESLs. The reason for this is because there might be scenarios where the fragmentation of the erasure requires a large ESL table and still any additional information regarding erasures will be meaningful for the RS decoder. By "fragmentation of the erasure" is meant a situation where there might be erroneous section(s) of 1 byte and erroneous section(s) of 1 Kbyte. In such cases there are two sub-optimal options: (a) using the RS decoder only for error correction(s) instead of erasure correction(s), or (b) limiting the size of the ESL table.

The first sub-optimal option involves using an array of 6-bit counters whose length (the number of counters) equals, or matches, the byte-wise length of the MPE-FEC columns, where the column size equals the number of rows in the MPE-FEC table. This way, to each row in the MPE-FEC table is assigned a counter. According to this solution, every time an erroneous section is detected, the counters corresponding to the rows (a counter per respective row) associated with that erroneous section are each incremented by one. Corresponding counters are continued to be incremented as erroneous sections are detected on the fly. Each counter represents the number of erasures at the corresponding row, and is auto incremented after each CRC calculation. If a counter overflows, or its value reaches a predefined value, it may be decided that the corresponding row in the MPE-FEC table has more than 32 errors. If all of the 6-bit counters overflow, or their value reach a predefined value, this situation is equivalent to an ESL table being full because the RS decoder is capable of correcting only half the maximum erasures that still enable full MPE-FEC frame correction. This solution requires a memory of 6 Kbits when the length of a column is 1,024 rows (6 bits×1,024 rows), though this is yet a significant save in the memory (ESL table) size when comparing to the 255 Kbits used in common practice implementation.

Another improvement that is applicable for both fixed-size and dynamic ESL tables is to set an array of size, or length, of a column (for example 1024 bits), such that each one of these bits is used to indicate whether there is at least one erroneous byte in the corresponding row. Then, before the rows are forwarded to the RS decoder, and if the corresponding bit is zero, the row is corrected and hence there is no need for the RS decoder to decode it, thereby eschewing analyzing the ESL again for every row.

In some embodiments the contents of the ESL table may be stored in a demodulator chip or unit, and the 2 Mbits—MPE-FEC table may be stored in a host processor's dynamic random access memory ("DRAM"), in a way shown and described in PCT/IL2004/001082, thus facilitating an efficient and reduced-sized memory implementation.

In some embodiments the contents of the ESL table may be stored in the host processor DRAM handled by the host processor. In these embodiments, the demodulator may forward to the host CRC failure and success indications together with the received MPE sections, and receive erasure indication on each row being read from the host processor's DRAM.

As the ESL table provides the accumulated length (S) of continuous unreliable MPE sections, this information may be beneficially used to monitor the duration of impulsive, and possibly other types of, interferences in the communication channel, in order to evaluate the quality of the communication path or link. Put more simply, there is a high correlation between S and the quality of the communication path or link: the poorer the communication path/link the longer is S (the more consecutive erroneous sections there are). S may also have several values (lengths) per one MPE-FEC frame. Therefore, data such as the data stored in an ESL table (for example S), including the variance of S per MPE-FEC frame, may be useful for: (a) diagnostics, (b) initiating handover between two different frequencies that are used for transmission of the same data, and (c) closing a feedback with other modules or components in the receiver, demodulator or tuner. For example, RF tuners typically include low noise amplifiers ("LNAs") and programmable gain amplifiers ("PGAs"), and S may be used as part of, or factored in, a control loop that sets their gain. S may also indicate a fading signal situation. S may also be utilized to switch between processing algorithms. For example, if S has a value greater than a threshold value, which may imply poor communication path, then "stronger" processing algorithm(s) may be employed. In addition, S may be used in conjunction with one or more other communication parameters for controlling the operation of a receiver. Alternatively, S may be used alone to control the operation of a receiver.

Figure 14:
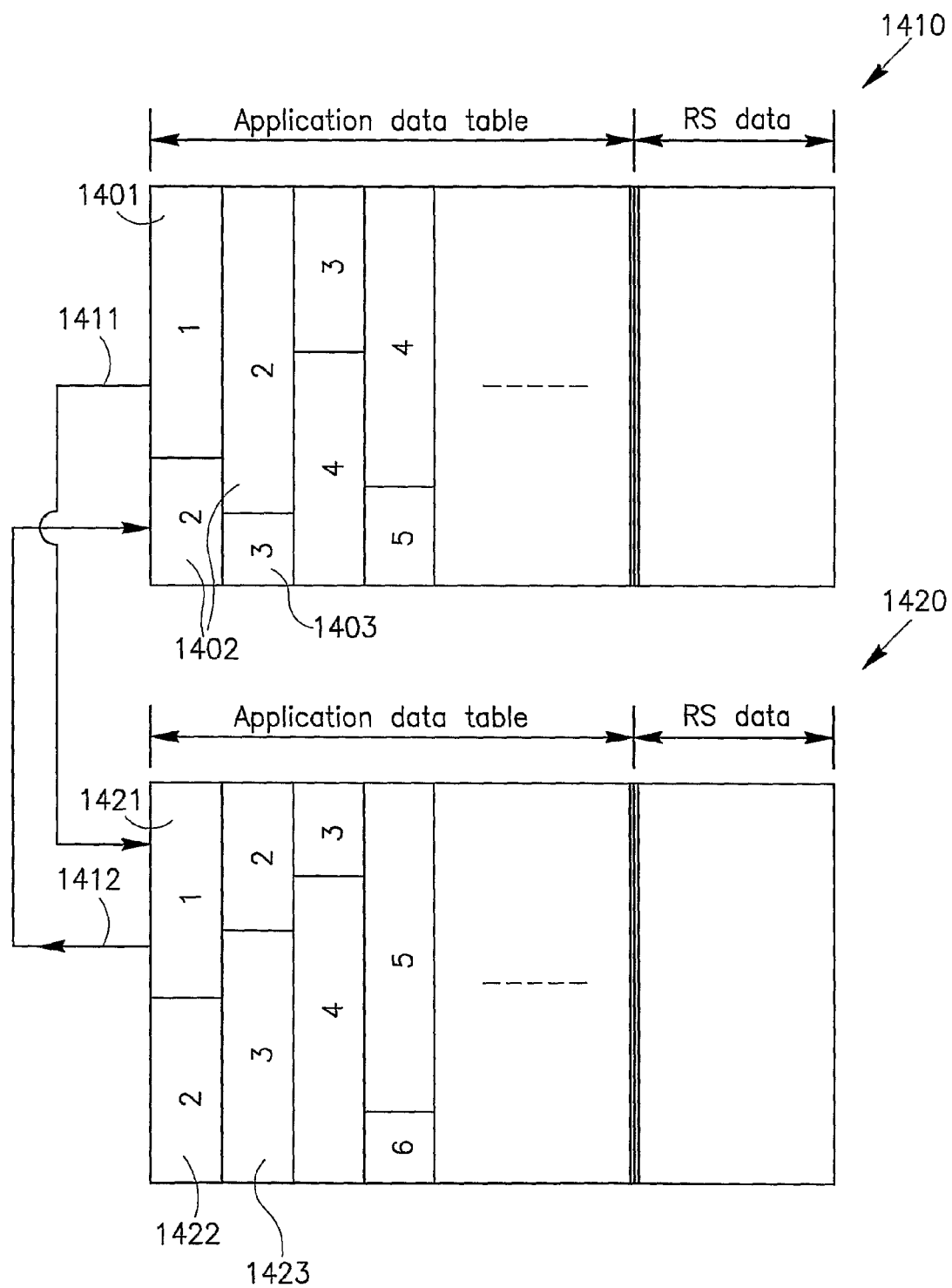
FIG. 14 schematically exemplifies simultaneous reception and processing of two MPE-FEC frames.

Referring now to FIG. 14, a simultaneous reception and processing of two MPE-FEC frames is schematically illustrated and described. "Simultaneous reception and processing" refers herein to situations where two or more MPE-FEC frames belonging to different streams may be simultaneously received by a receiver (over different RF channels, for example) and simultaneously processed by the receiver while the receiver uniquely allocates an ESL table per MPE-FEC frames stream. "Simultaneous reception and processing" may alternatively refer to situations where two or more MPE-FEC frames belonging to different streams may be received by a receiver one frame after another, and simultaneously processed by the receiver while the receiver uniquely allocates an ESL table per MPE-FEC frames stream.

Depending on the service used, a receiver, such as the DVB-H receiver of FIG. 8, may simultaneously receive several data types. For example, the receiver may receive a stream of MPE-FEC frames relating to a video signal while the receiver simultaneously receives a stream of MPE-FEC frames relating to an audio signal that may be associated (whether synchronized or not) with the video signal. More generally, the receiver of FIG. 8 (for example) may receive two or more distinct streams of MPE-FEC frames, whether simultaneously or not, that may or may not relate to different types of data, information or signals, that may or may not be associated with one another. For example, MPE-FEC frame 1410 may contain data that relates to a portion of a video signal of a movie, whereas MPE-FEC frame 1410 may contain data that relates to a synchronized portion of an audio signal of that movie. The data contained in MPE-FEC frames 1410 and 1420 may be transmitted, and received by a receiver, in such a way that the receiver may receive the first section 1401 of MPE-FEC frame 1410 and concurrently the first section 1421 of MPE-FEC frame 1420 (shown as 1411) and concurrently the second section 1402 of MPE-FEC frame 1410 (shown as 1412) and concurrently the second section 1422 of MPE-FEC frame 1420, and concurrently the third section 1403 of MPE-FEC frame 1410 and concurrently the third section 1423 of MPE-FEC frame 1420, and so on.

In some embodiments of the present disclosure, the receiver may utilize as many ESL tables as there are distinct streams of MPE-FEC frames: an ESL table per distinct stream of MPE-FEC frames. That is, a ESL table may be dedicated for a given stream of MPE-FEC frames and updated as sections in each MPE-FEC frame within the given stream are checked in the way described hereinbefore.

In some embodiments of the present disclosure the receiver, such as the receiver of FIG. 8, may be allowed to enter a sleep mode of operation after a MPE-FEC frame of a first stream (for example MPE-FEC frame 1410) is processed and before a frame from another stream (for example MPE-FEC frame 1420) is processed. Alternatively, the receiver may be allowed to enter a sleep mode of operation after processing a first MPE-FEC frame of a first stream (for example MPE-FEC frame 1410) and a second MPE-FEC frame of a second stream (for example MPE-FEC frame 1420).

In some embodiments a receiver including or using an ESL table may comply with the Enhanced Packet Mode DAB standard. In some other embodiments a receiver including or using an ESL table may comply with the high-definition television ("HDTV") standard.

While certain features of the disclosure have been illustrated and described herein, many modifications, substitutions, changes, and equivalents will now occur to those skilled in the art. It is, therefore, to be understood that the appended claims are intended to cover all such modifications and changes as fall within the true spirit of the disclosure.

What is claimed is:

1. A receiver adapted to receive multi-protocol encapsulation forward error correction frame type application data and encoded error correction data, and to correct erroneous sections in said application data, comprising:
   an erasure structure list table for storing therein data relating to unreliable sections within the multi-protocol encapsulation forward error correction frame;
   a data processing unit;
   wherein said data processing unit is adapted to: (i) accept an indication per erroneous section; and (ii) cause said data relating to the unreliable sections to be stored in said erasure structure list table based on said indication(s); and
   wherein the data contained in the erasure structure list table is utilized for performing handovers.

2. The receiver of claim 1, wherein the data comprises, per erroneous section, the address of said section within the multi-protocol encapsulation forward error correction frame and the bit-wise length of said section.

3. The receiver of claim 1, wherein data relating to an unreliable section is stored in the erasure structure list table if the unreliable section contains at least one error.

4. The receiver of claim 1, wherein an error detection module provides the indication(s) for errors in erroneous section(s) by performing a cyclic redundancy check.

5. The receiver of claim 1, wherein the size of the erasure structure list table is fixed.

6. The receiver of claim 1, wherein the size of the erasure structure list table dynamically changes to accommodate for additional erroneous sections as they are detected.

7. The receiver of claim 1, wherein the receiver complies with the digital video broadcast handheld ("DVB-H") standard.

8. The receiver of claim 1, wherein the receiver complies with the high-definition television ("HDTV") standard.

9. The receiver of claim 1, wherein the receiver complies with the Enhanced Packet Mode DAB standard.

10. The receiver of claim 1, wherein the data contained in the erasure structure list table is utilized for diagnostics purposes in respect of the receiver's operation.

11. The receiver of claim 1, wherein data contained in the erasure structure list table is used in a feedback loop(s) for controlling the operation of said receiver.

12. The receiver of claim 1, wherein data contained in the erasure structure list table is used for monitoring impulsive interference(s).

13. The receiver of claim 1, wherein the erasure structure list table and the multi-protocol encapsulation forward error correction frame are stored in and used by a host.

14. The receiver of claim 1, wherein the receiver enters a sleep mode after receiving one multi-protocol encapsulation forward error correction frame.

15. The receiver of claim 1, wherein the receiver enters a sleep mode after receiving multiple multi-protocol encapsulation forward error correction frames.

16. The receiver of claim 1, wherein the receiver simultaneously receives and processes two or more frames belonging to different multi-protocol encapsulation forward error correction streams, and said receiver uniquely allocates an erasure structure list table to each of said stream.

17. The receiver of claim 16, wherein the different multi-protocol encapsulation forward error correction streams are associated with different types of data or information.

18. The receiver of claim 16, wherein the different multi-protocol encapsulation forward error correction streams are associated with the same type of data or information.

19. The receiver of claim 1, wherein said data processing unit causes a decoder to correct erroneous sections based on the data stored in the erasure structure list.

20. The receiver of claim 19, wherein said decoder is a Reed-Solomon decoder.

21. The receiver of claim 19, wherein counters are assigned to respective rows in a multi-protocol encapsulation forward error correction frame, each of which is incremented every time an erroneous section is found which overlaps the respective row.

22. The receiver of claim 21, wherein a row is corrected by the decoder if the entire multi-protocol encapsulation forward error correction frame has been checked and the respective counter has not reached a preset value.

23. The receiver of claim 19, wherein the data processing unit checks the erasure structure list table, per received multi-protocol encapsulation forward error correction frame, and disables receiving circuitry and the decoder if said erasure structure list complies with a specified criterion.

24. The receiver of claim 23, wherein the data processing unit enables said receiving circuitry and said decoder if, after reception of the entire application data table portion of the multi-protocol encapsulation forward error correction frame, the erasure structure list table does not comply with a predefined criterion.

25. The receiver of claim 24, wherein the specified criterion is the erasure structure list table being either empty or full.

* * * * *